(12) United States Patent
Inoue

(10) Patent No.: US 8,981,719 B2
(45) Date of Patent: Mar. 17, 2015

(54) BATTERY PACK CHARGER

(75) Inventor: Koichi Inoue, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 737 days.

(21) Appl. No.: 13/074,492

(22) Filed: Mar. 29, 2011

(65) Prior Publication Data

US 2011/0241621 A1 Oct. 6, 2011

(30) Foreign Application Priority Data

Apr. 1, 2010 (JP) ................................. 2010-085570

(51) Int. Cl.
*H02J 7/00* (2006.01)

(52) U.S. Cl.
CPC .................................. *H02J 7/0045* (2013.01)
USPC ............................. 320/114; 320/107; 320/112

(58) Field of Classification Search
USPC .......................... 320/112, 113, 107, 114, 115
See application file for complete search history.

(56) References Cited

U.S. PATENT DOCUMENTS

| 4,536,694 | A | * | 8/1985 | McCarty et al. ............... 320/111 |
| 5,415,947 | A | | 5/1995 | Mitsui et al. |
| 5,630,193 | A | | 5/1997 | Miyake et al. |
| 7,446,502 | B2 | * | 11/2008 | Tong ............................... 320/110 |
| 7,659,696 | B2 | * | 2/2010 | Zeiler et al. ..................... 320/115 |
| 2003/0085686 | A1 | * | 5/2003 | Haga et al. ..................... 320/112 |
| 2006/0055369 | A1 | * | 3/2006 | Duesselberg ................. 320/112 |
| 2006/0071634 | A1 | * | 4/2006 | Meyer et al. .................. 320/112 |
| 2006/0220611 | A1 | * | 10/2006 | Choi ............................... 320/112 |
| 2007/0285051 | A1 | * | 12/2007 | Jeon et al. ...................... 320/112 |
| 2008/0100262 | A1 | * | 5/2008 | Ozaki et al. ................... 320/112 |
| 2009/0051313 | A1 | * | 2/2009 | Yoshimura et al. ........... 320/107 |
| 2010/0109605 | A1 | * | 5/2010 | Nakasho et al. ............... 320/113 |
| 2011/0193523 | A1 | * | 8/2011 | Law ............................... 320/113 |

FOREIGN PATENT DOCUMENTS

| JP | 3-205758 | 9/1991 |
| JP | 5-167498 | 7/1993 |
| JP | 5-335010 | 12/1993 |
| JP | 6-68303 | 9/1994 |
| JP | 7-161386 | 6/1995 |
| JP | 8-9003 | 1/1996 |
| JP | 8-171890 | 7/1996 |
| JP | 2000-82501 | 3/2000 |
| JP | 2001-77894 | 3/2001 |

(Continued)

*Primary Examiner* — Richard Isla Rodas
*Assistant Examiner* — Michael Dibenedetto
(74) *Attorney, Agent, or Firm* — Wenderoth, Lind & Ponack, LLP

(57) ABSTRACT

A battery pack charger including a case (1) having an attachment section (2) where a battery pack (30) can be attached in a detachable manner, and a plurality of connecting terminals (3) disposed in an exposed manner in the attachment section to connect with external terminals (33) on the battery pack. The connecting terminals are disposed in approximately vertical orientation in a plurality of approximately parallel rows. The case has terminal through-holes (52) opened through the case between adjacent connecting terminals. Even if there is ingress of foreign material, such as dust and dirt, between the connecting terminals, that material can fall through the holes in the case. Foreign material collection between the connecting terminals can be avoided, and the battery pack charger has the positive feature that unintended conduction, such as leakage current and short-circuit, can be avoided.

16 Claims, 19 Drawing Sheets

(56) References Cited

FOREIGN PATENT DOCUMENTS

| JP | 2003-299253 | 10/2003 | |
| JP | 2004-236450 | 8/2004 | |
| JP | 2004236450 A | * 8/2004 | |
| JP | 2008-86162 | 4/2008 | |
| JP | 2008-236882 | 10/2008 | |
| JP | 2008236882 A | * 10/2008 | |

* cited by examiner

BATTERY PACK CHARGER

BACKGROUND OF THE INVENTION

1. Field of the Invention

The present invention relates primarily to a battery pack charger for charging a battery pack that attaches in a detachable manner and supplies power to electrical equipment such as an electric power tool.

2. Description of the Related Art

Electrical equipment such as electric power tools can be conveniently used on-site (such as at a construction site) as cordless power tools by attaching (in a detachable manner) a battery pack housing batteries that can be charged. Further, a detachable-type battery pack can be used repeatedly by detaching it from the electrical equipment and recharging. A battery pack, which houses batteries that have run down in charge capacity, is charged by attaching it to a battery charger. Battery chargers for charging these types of battery packs have been made practical. A representative battery charger has an attachment section on the upper surface of the case to mount a battery pack in a detachable manner, and is provided with charging terminals exposed in the attachment section. External terminals on a battery pack attached in the attachment section connect with the charging terminals on the battery charger, and the battery charger outputs charging power from the charging terminals to charge the battery pack.

Refer to Japanese Laid-Open Patent Publication 2008-236882 and 2004-236450.

SUMMARY OF THE INVENTION

The battery charger cited in JP 2008-236882 is shown in FIG. 25. This battery charger is provided with a plurality of connecting terminals 93 disposed in an attachment section 92 for attaching a battery pack in a detachable manner. The connecting terminals 93 are a plurality of metal plates disposed in a parallel arrangement. The connecting terminals 93 are made up of positive and negative charging terminals 94 disposed at both ends, and a plurality of signal terminals 95 disposed between the charging terminals 94. A battery pack can easily be attached in a manner parallel to this connecting terminal arrangement to connect battery pack terminals that correspond to the connecting terminals.

However, this arrangement of a plurality of parallel disposed, separated connecting terminals has the problem that foreign material such as dirt and dust can easily collect between connecting terminals. In particular, since an electric power tool battery pack charger is used in dirty dust-filled environments such as construction sites, dirt and dust can easily collect in the connecting terminals. When foreign material between connecting terminals becomes damp with moisture, leakage currents can occur between connecting terminals. In a worst-case scenario, short-circuit between terminals can ignite flammable foreign material and start a fire (since voltages on the shorted terminals track each other, this phenomenon has been named "tracking" in Japan).

The present invention was developed considering the background discussed above. Thus, it is a primary object of the present invention to provide a battery pack charger that can avoid leakage and short-circuit caused by foreign material such as dust and dirt between connecting terminals.

To achieve the object described above, the battery pack charger for the first aspect of the present invention can charge a chargeable battery pack 30 attached to the battery pack charger in a detachable manner. The battery pack charger can be provided with a case 1 having an attachment section 2 where the battery pack 30 is attached in a detachable manner, and a plurality of connecting terminals 3 disposed in an exposed manner in the attachment section 2 to connect with external terminals 33 on the battery pack 30. The connecting terminals 3 can be disposed in approximately vertical orientation in a plurality of approximately parallel rows. The case 1 can have terminal through-holes 52 opened through the case 1 between adjacent connecting terminals 3. Accordingly, even if there is ingress of foreign material such as dust and dirt between the connecting terminals, that material will fall through the holes in the case. As a result, foreign material collection between the connecting terminals can be avoided, and the battery pack charger can achieve the positive feature that unintended conduction such as leakage current and short-circuit can be avoided. In addition, holes through the case of the battery pack charger can be aesthetically interesting from a design perspective.

In the second aspect of the battery pack charger of the present invention, the attachment section 2 can be configured with attachment guides 50 to guide battery pack guides 60 established on the battery pack 30 and attach the battery pack 30 in the attachment section 2. Viewed in cross-section, the attachment section 2 is formed as a cavity in the upper surface of the case 1, and the attachment guides 50 are formed protruding from the interior walls on both sides of the attachment section 2 cavity. In addition, attachment section through-holes 51 can be formed through the attachment section 2 of the case 1 with openings that have more area than the outlines of the attachment guides 50. Further, the attachment section through-holes 51 can be opened in a direction approximately parallel to the opening direction of the terminal through-holes 52. Accordingly, establishing attachment section through-holes in the attachment section allows moisture collection in the attachment section and unintended electrical conduction to be avoided. Further, opening the attachment section through-holes and the terminal through-holes in the same direction has the positive feature that molded pieces can be more easily removed from the mold during case molding.

In the third aspect of the battery pack charger of the present invention, the attachment section through-holes 51 can be formed as a pair of through-holes that sandwich the connecting terminals 3 in between. Further, the attachment section through-holes 51 can be positioned to at least partially overlap with the terminal through-holes 52 in the lengthwise direction. Accordingly, through-holes are positioned between adjacent connecting terminals and on both sides of the connecting terminals to allow foreign material such as dust to fall through both sides of the case avoiding leakage and short-circuit.

In the fourth aspect of the battery pack charger of the present invention, the attachment section through-holes 51 can be opened in a slit shape, and the attachment guides 50 can be disposed above, and coincident with the open area of the attachment section through-holes 51. Accordingly, the attachment guides can be formed while opening the coincident attachment section through-holes. This has particular advantage with respect to mold formation, and achieves the positive feature that manufacture can be simplified.

The battery pack charger for the fifth aspect of the present invention can be configured to form the attachment guides 50 with sizes that correspond to battery pack charger electrical specifications while keeping the attachment section through-holes 51 a constant size. Battery pack guides 60 on a battery pack 30 electrically compatible with the battery pack charger can be shaped to conform to the attachment guides 50 and the battery pack 30 can be attached in the attachment section 2. In contrast, a battery pack 30' with different electrical specifications cannot be attached because battery pack guides 60 and attachment guides 50 are not made compatible. Accordingly, attachable battery packs are mechanically selected according to the size of the attachment guides. When electrical specifications such as battery pack charging voltage are compatible, the battery pack can be attached in the attachment section. When battery pack and battery pack charger electrical specifications are not compatible, it is physically impossible to attach the battery pack in the attachment guides. This has the positive feature that incorrect battery pack attachment can be avoided and charging can be performed safely. Meanwhile, since case structure is common except for the attachment guides, battery pack chargers with different electrical specifications can be manufactured with common parts and manufacturing cost can be reduced.

The battery pack charger for the sixth aspect of the present invention can be configured to make the length of the attachment guides 50 according to the position of battery pack identifier ribs 62 established in the battery pack guides 60. When a battery pack 30 with compatible electrical specifications is attached to the battery pack charger, the ends of the attachment guides 50 contact the battery pack identifier ribs 62 allowing the battery pack 30 to be attached in the attachment section 2. In contrast, when attempt is made to attach a battery pack 30' that is not electrically compatible with the battery pack charger, interference between the battery pack identifier ribs 62' and the ends of the attachment guides 50 makes it impossible to insert the battery pack guides 60 in the attachment guides 50. As a result, battery packs that can be attached in the attachment section are mechanically selected according to the length of the attachment guides and the location of the battery pack identifier ribs. When electrical specifications such as battery pack charging voltage are compatible, the battery pack can be attached in the attachment section. When battery pack and battery pack charger electrical specifications are not compatible, it is physically impossible to attach the battery pack in the attachment guides. This has the positive feature that incorrect battery pack attachment can be avoided and charging can be performed safely. Meanwhile, since case structure is common except for the attachment guides, battery pack chargers with different electrical specifications can be manufactured with common parts and manufacturing cost can be reduced.

In the seventh aspect of the battery pack charger of the present invention, the case 1 can be made up of an upper case 1A and a lower case 1B, and the attachment guides 50 can be formed in the lower case 1B. Accordingly, since the upper case is common and only the lower case is changed according to electrical specifications, manufacturing cost can be reduced when producing battery pack chargers with different electrical specifications.

The battery pack charger for the eighth aspect of the present invention can be configured to form the lower case 1B with a mold that has a mold-cavity insert, and attachment guides 50 having different lengths can be formed by changing the mold-cavity insert. This has the positive feature different length attachment guides can be formed just by changing the mold-cavity insert, and lower cases with various shapes can be made while holding down manufacturing cost.

The battery pack charger for the ninth aspect of the present invention can be configured with a circuit board 14 carrying a battery pack 30 charging circuit 20 mounted inside the case 1. The case 1 can be formed with a circuit board mounting rib 16, and the circuit board 14 can be made with a circuit board slit 14b in a position corresponding to the circuit board mounting rib 16 to allow its insertion. Further, the positions of the circuit board mounting rib 16 and the circuit board slit 14b can be set to allow a circuit board 14 to be mounted in a case 1 provided with attachment section 2 attachment guides 50 sized for a battery pack 30 with electrical specifications compatible with the charging circuit 20 on that circuit board 14. This allows a circuit board 14 to be mounted in a case 1 when the charging circuit 20 on that circuit board 14 has electrical specifications compatible with a battery pack 30 that fits in the attachment guides 50 in that case 1. In contrast, a circuit board 14' having electrical specifications compatible with a different battery pack 30' cannot be mounted in that case 1. Accordingly, since proper matching of a case and a circuit board can be determined by the positions of the circuit board mounting rib and the circuit board slit, mating improper parts during assembly can be avoided to improve quality and reliability.

The battery pack charger for the tenth aspect of the present invention can be configured with a mold-cavity insert in the mold that forms the case 1, and the circuit board mounting rib 16 can be formed in different positions by changing the insert in the mold-cavity. Consequently, different circuit board mounting rib positions can be produced simply by changing the mold-cavity insert. This has the positive feature that cases with various shapes can be made while holding down manufacturing cost.

In the eleventh aspect of the battery pack charger of the present invention, the connecting terminals 3 can be mounted in a terminal holder 8, and the terminal holder 8 can be connected to the case 1 in a floating configuration. Since the terminal holder is not rigidly mounted in the case and can move to some degree, dimensional mismatch can be absorbed. Consequently, the battery pack can be reliably attached to the battery pack charger due to connecting terminal movement adjusting to the external terminals on the battery pack during attachment.

In the twelfth aspect of the battery pack charger of the present invention, bosses 18 can be provided in the case 1, and boss insertion holes 8b with an inside diameter greater than the outside diameter of the bosses 18 can be opened through the terminal holder 8 in positions corresponding to the boss 18 locations. By inserting the bosses 18 in the boss insertion holes 8b with intervening flexible washers, the terminal holder 8 can be joined to the case 1 in a floating configuration. This can connect the terminal holder in a floating configuration with a simple structure.

In the thirteenth aspect of the battery pack charger of the present invention, the plurality of connecting terminals 3 can have a flat-plate shape and can be disposed in parallel orientation. The flat-plate connecting terminals 3 can be disposed perpendicular to the bottom surface 2A of the attachment section 2 extending in a direction parallel to the battery pack 30 detachment sliding direction. Accordingly, the plurality of connecting terminals can smoothly connect with battery pack external terminals as a result of battery pack attachment.

In the fourteenth aspect of the battery pack charger of the present invention, the plurality of connecting terminals 3 can be provided with positive and negative charging terminals 4 disposed on both sides, and non-charging terminals 5 disposed between the charging terminals 4. This can effectively prevent leakage and short-circuit between the charging terminals disposed on both sides.

In the fifteenth aspect of the battery pack charger of the present invention, electrical specifications can be determined by the number of rechargeable batteries 39 included in the battery pack 30. This allows battery packs to be properly identified by the number of batteries used in the battery pack. The above and further objects of the present invention as well as the features thereof will become more apparent from the following detailed description to be made in conjunction with the accompanying drawings.

DETAILED DESCRIPTION OF THE EMBODIMENT

Figure 1:
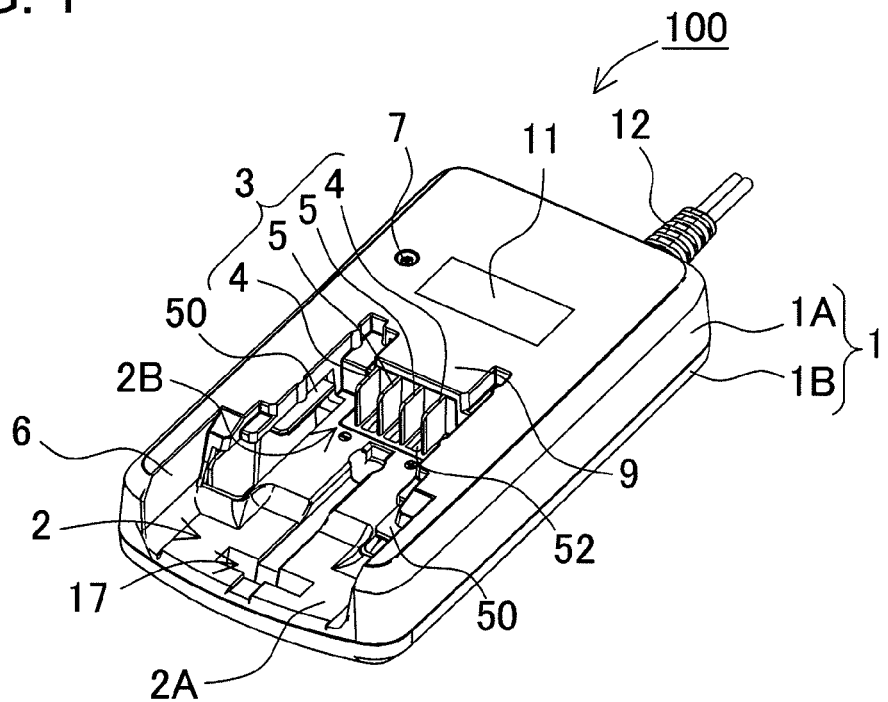
FIG. 1 is a perspective view of a battery pack charger for an embodiment of the present invention.

The following describes an embodiment of the present invention based on the figures.

This embodiment describes an example of a battery pack 30 used in an electric power tool. The battery pack charger 100 is provided with a case 1 having an attachment section 2 where a battery pack 30 housing rechargeable batteries 39 can be attached in a detachable manner, and a plurality of connecting terminals 3 disposed in an exposed manner in the attachment section 2 to connect with external terminals 33 on the battery pack 30. In addition, the case 1 of the battery pack charger 100 houses a circuit board 14 carrying a charging circuit 20 for charging the battery pack 30 attached in the attachment section 2.

(Case 1)

Figure 2:
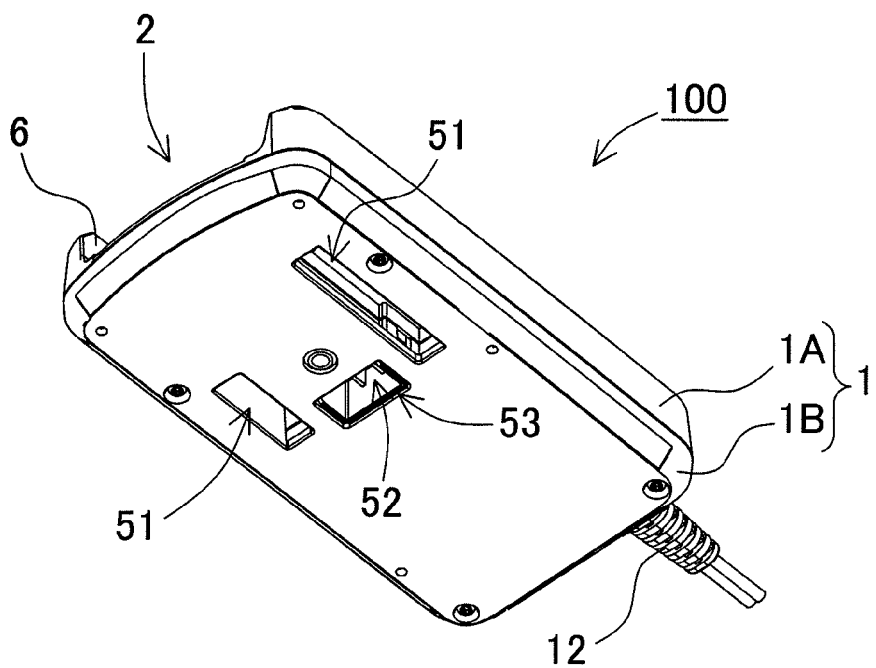
FIG. 2 is a perspective view from behind and below the battery pack charger in FIG. 1.
Figure 6:
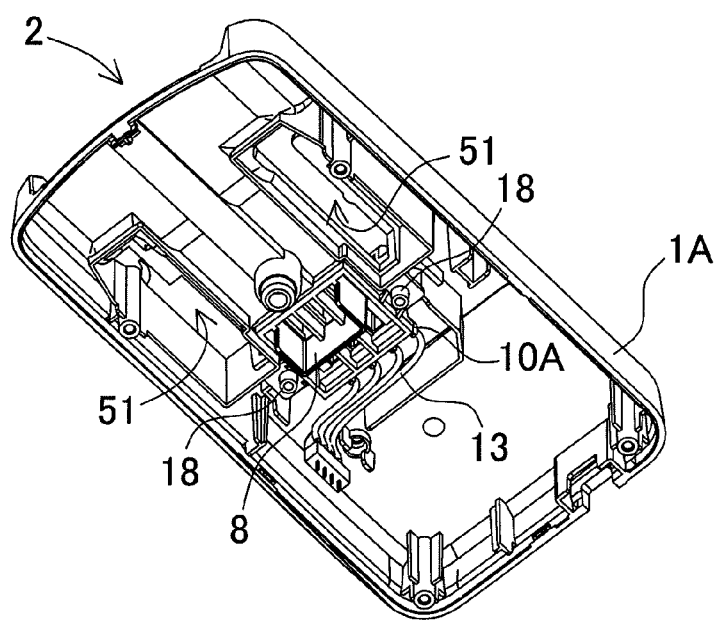
FIG. 6 is a perspective view showing the upper case in FIG. 3.
Figure 7:
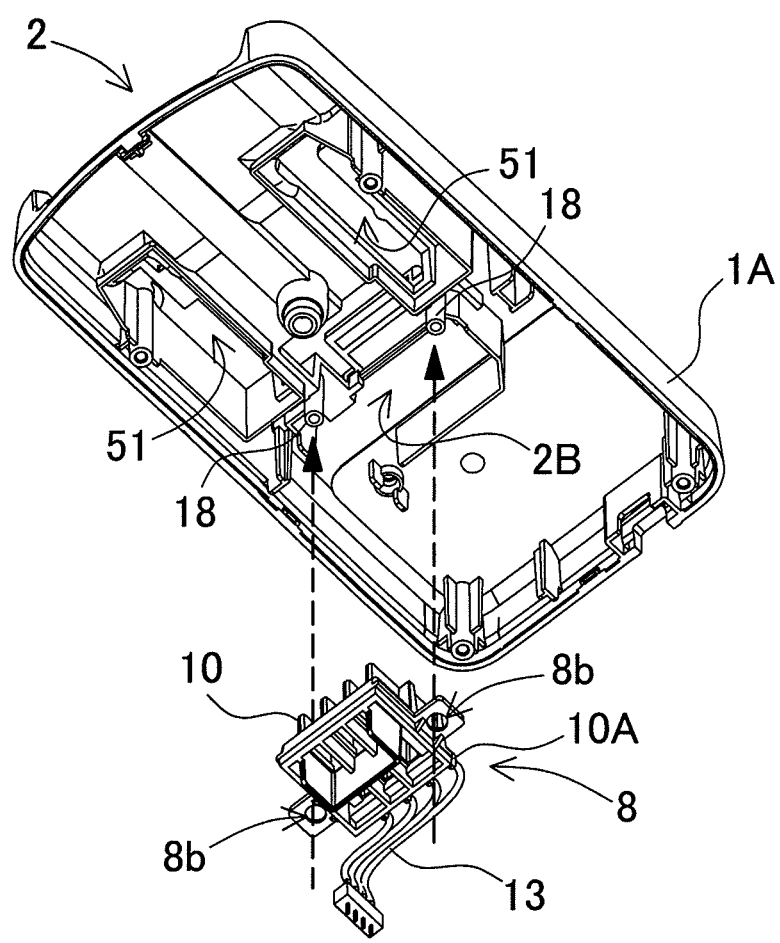
FIG. 7 is an exploded perspective view showing attachment of the terminal holder to the upper case in FIG. 6.
Figure 8:
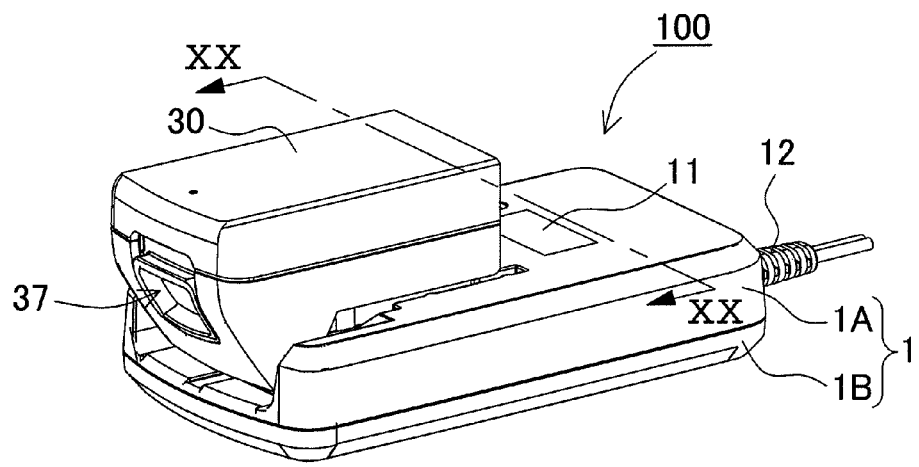
FIG. 8 is a perspective view showing the battery pack charger in FIG. 1 with a battery pack attached.
Figure 9:
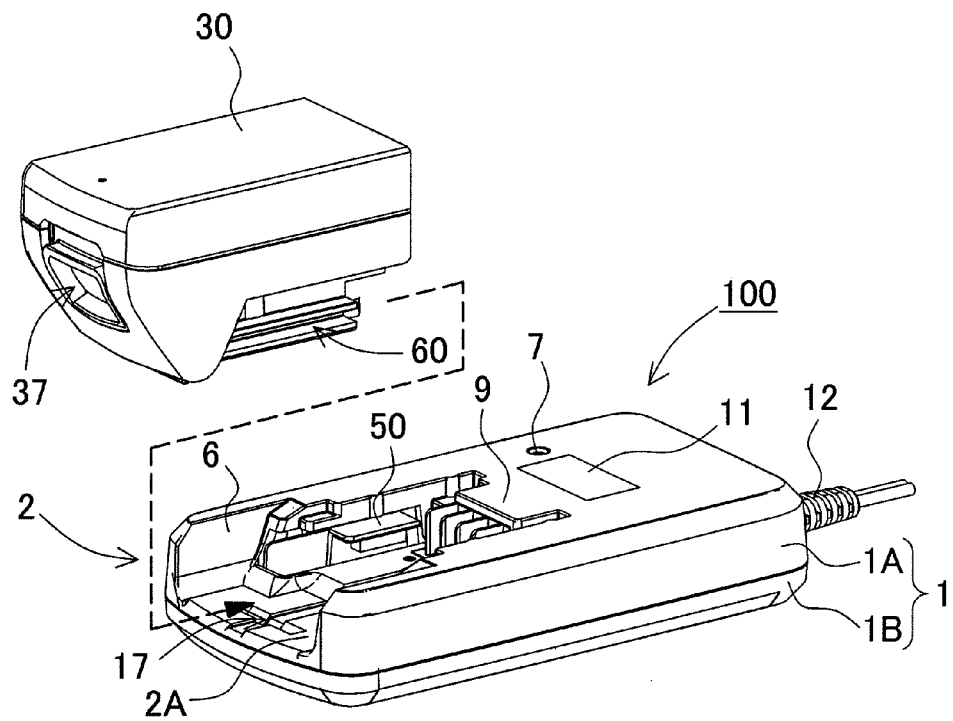
FIG. 9 is a perspective view showing the battery pack detached from the battery pack charger in FIG. 8.
Figure 10:
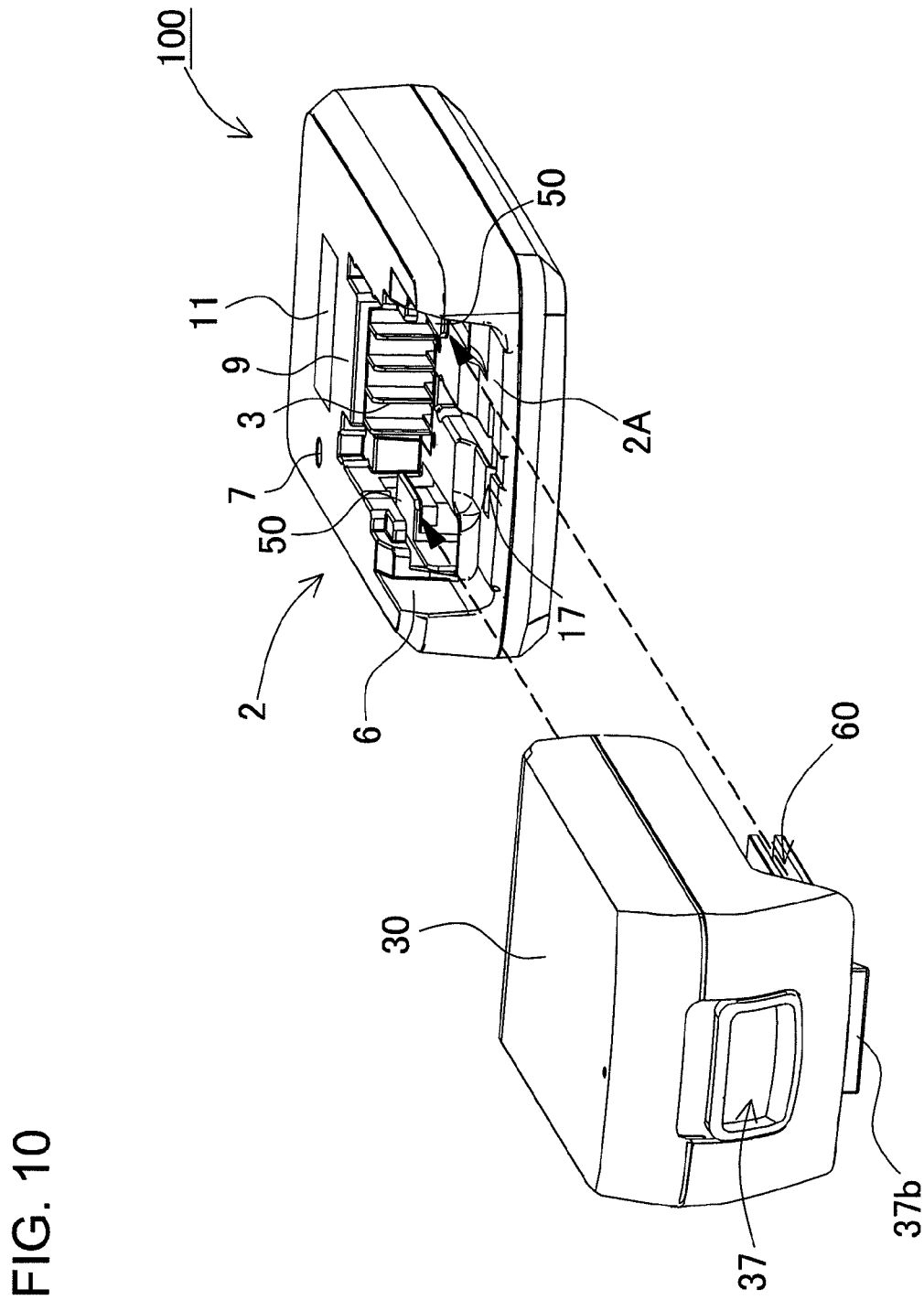
FIG. 10 is a perspective view showing the situation in FIG. 9 from a different angle.

As shown in FIGS. 1 and 2, the case 1 is formed in a thin-outline box-shape with a width significantly greater than the thickness. Viewed in cross-section, the attachment section 2 is established as a cavity in the case 1, and is cut-out from the upper to front surfaces of the case 1. As shown in FIGS. 8-10, a battery pack 30 attaches in the attachment section 2. As shown in FIGS. 3-7, the case 1 is divided into an upper case 1A and a lower case 1B. The circuit board 14 carrying a charging circuit 20 is mounted inside the case 1. In addition, a terminal holder 8 provided with connecting terminals 3 is installed in the case 1. The terminal holder 8 is installed in the upper case 1A in an orientation protruding out from a connecting opening 2B inside the upper case 1A. As shown in FIGS. 6 and 7, the terminal holder 8 is installed in the upper case 1A in a floating configuration.

Figure 3:
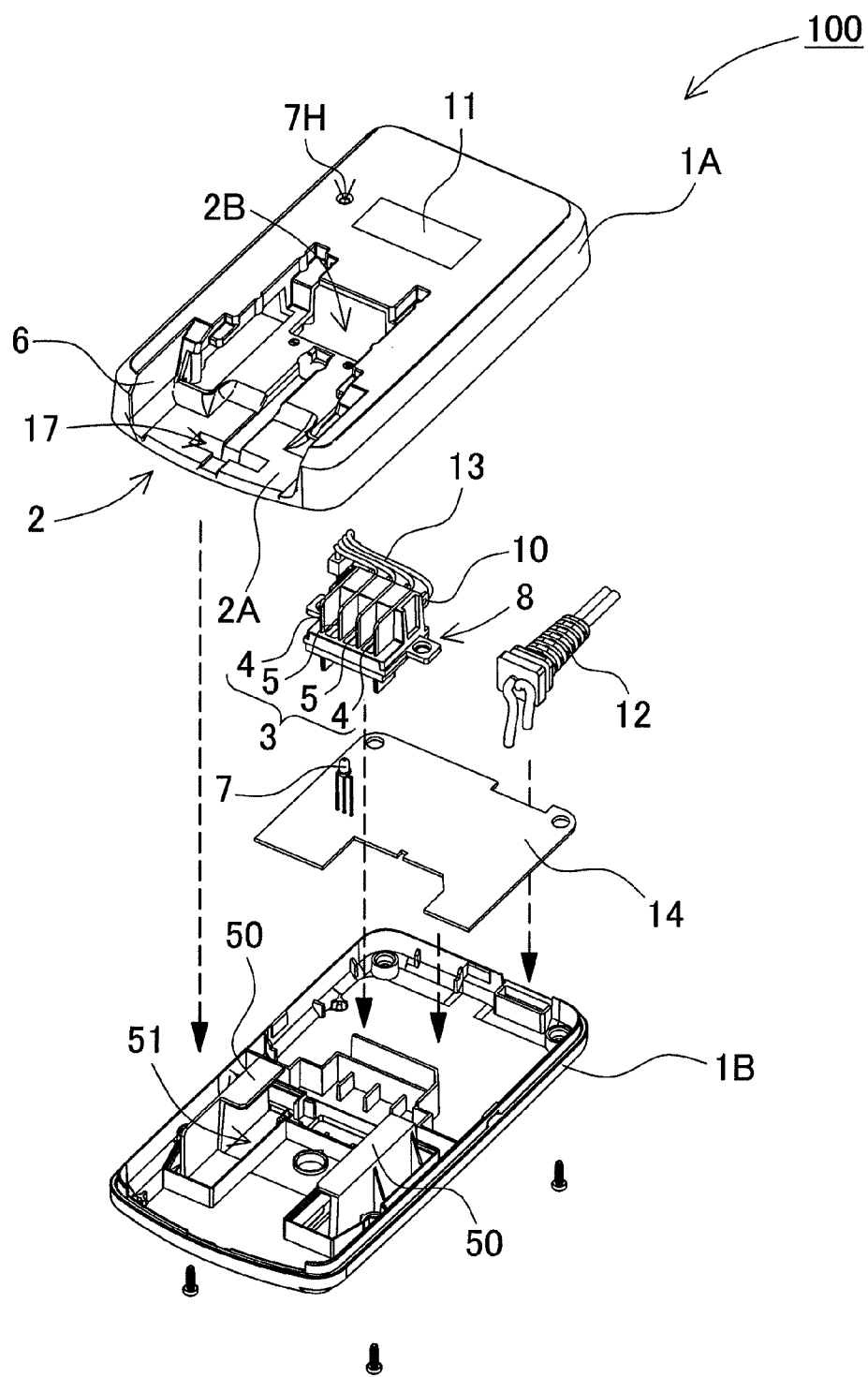
FIG. 3 is an exploded perspective view of the battery pack charger in FIG. 1.

The case 1 is formed from resin material with superior mechanical strength and insulating properties such as acrylonitrile-butadiene-styrene (ABS) resin. As shown in FIG. 3, the circuit board 14 is mounted inside the case 1, and the battery pack charging circuit 20 is mounted on the circuit board 14. An indicator lamp 7 such as a light emitting diode (LED) is also mounted on the circuit board 14. The indicator lamp 7 is exposed outside the upper case 1A through an indicator window 7H. The charging state and/or abnormal charging conditions can be communicated to the user by indicator lamp illumination pattern and/or color changes and their combinations. The indicator lamp can also be disposed inside the upper case to shine through the case without opening an indicator window. This can avoid ingress of foreign material such as dust, dirt, and moisture through an indicator window.

Further, an information region 11 is established on the upper case 1A to display necessary information. The information displayed in the information region 11 can be fixed as in a simple attachment seal or stamped imprint, or it can be dynamically displayed by a liquid crystal display or seven-segment LED display. In addition, a power cord 12 is provided extending out the back of the case 1.

(Attachment Section 2)

The attachment section 2 is made in a cavity or groove shape with side-walls 6 established on both sides of a bottom surface 2A. The attachment section 2 is configured to let the battery pack 30 slide in and out of the cavity (groove) for attachment and detachment. Specifically, the battery pack charger 100 is provided with a structure that allows battery pack attachment by sliding the battery pack 30 along the lengthwise direction of the battery pack charger 100. In the example shown in FIGS. 8-11 and 20, this structure is implemented by attachment guides 50 provided along the attachment section side-walls 6 and battery pack guides 60 provided on corresponding side-walls of the battery pack 30.

The attachment section 2 guides a battery pack 30 into a fixed position via a structure that lets the battery pack 30 slide along the bottom surface 2A as well as along both side-walls 6. Accordingly, the gap between the pair of side-walls 6 is made approximately equal to, or slightly larger than the width of the battery pack 30 to allow the battery pack 30 to slide along the attachment section 2 side-walls 6. In the case 1 of FIG. 1, the gap between the pair of side-walls 6 gradually becomes narrower in the direction of battery pack 30 insertion. During battery pack insertion, this structure allows the insertion-side of the battery pack 30 to be smoothly guided into the attachment section cavity while reliably stopping the fully inserted battery pack 30 in a fixed position in the attachment section 2.

Although the bottom surface 2A of the attachment section 2 in the example of the figures is a horizontal surface, it can also be an inclined surface. For example, by making the bottom surface of the attachment section slope downward in the direction of battery pack insertion, the component of the battery pack gravity force parallel to the bottom surface acts in a direction to slide the battery pack downward into the attachment section. Consequently, this structure allows even a heavy battery pack to be easily and stably attached in a fixed position in the attachment section.

(Battery Pack 30)

Figure 12:
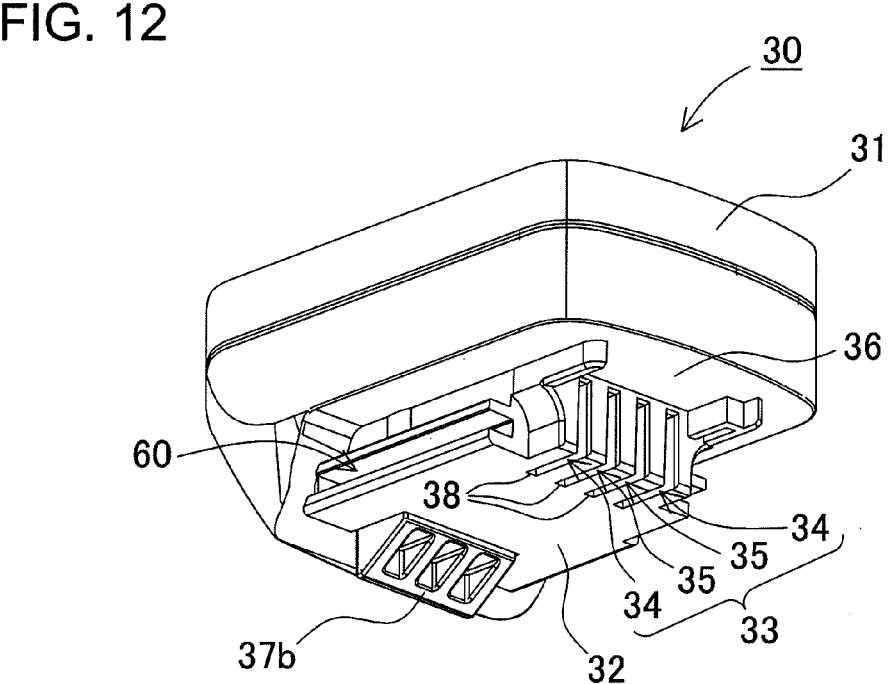
FIG. 12 is a perspective view of the battery pack in FIG. 9.
Figure 13:
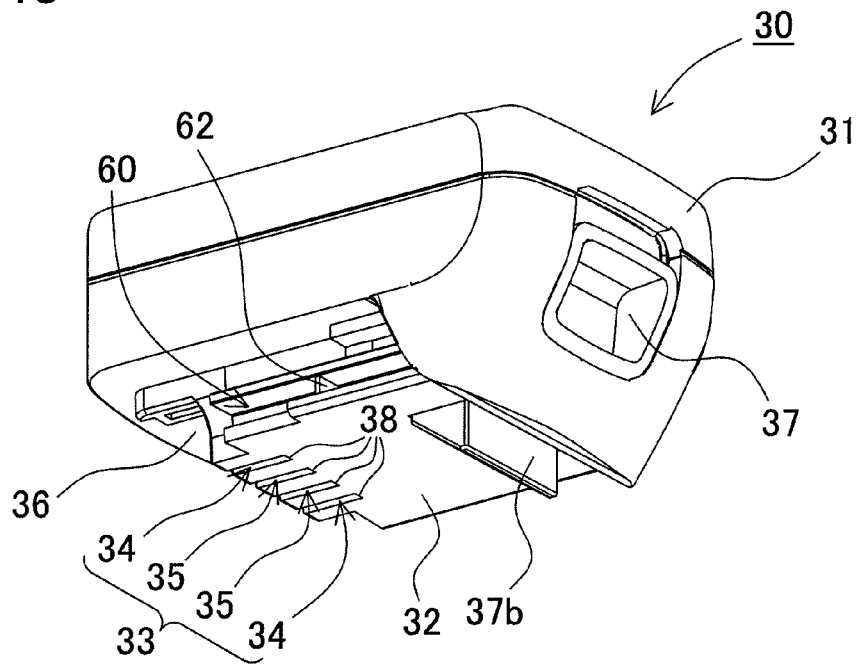
FIG. 13 is a perspective view viewed from behind of the battery pack in FIG. 12.

The external appearance of the battery pack 30 is shown in FIGS. 12 and 13. In addition to having exposed external terminals 33 to connect with the connecting terminals 3, the battery pack 30 has a retaining projection 37 to hold the battery pack 30 in the attachment section 2 when it is attached to the battery pack charger 100.

(Retaining Projection 37)

The retaining projection 37 has a latch release section the top, and at the bottom is provided with a latch 37b having an inclined surface that obliquely faces in the direction of battery pack attachment and a vertical surface formed in a manner connected to the inclined surface. The latch 37b is formed as a single-piece with the latch release section. In addition, the battery pack charger attachment section 2 has a retaining groove 17 formed in a position corresponding to the battery pack latch position. The retaining groove 17 has an inclined surface that conforms to the retaining projection inclined surface, and a vertical surface that conforms to the retaining projection vertical surface.

Figure 17:
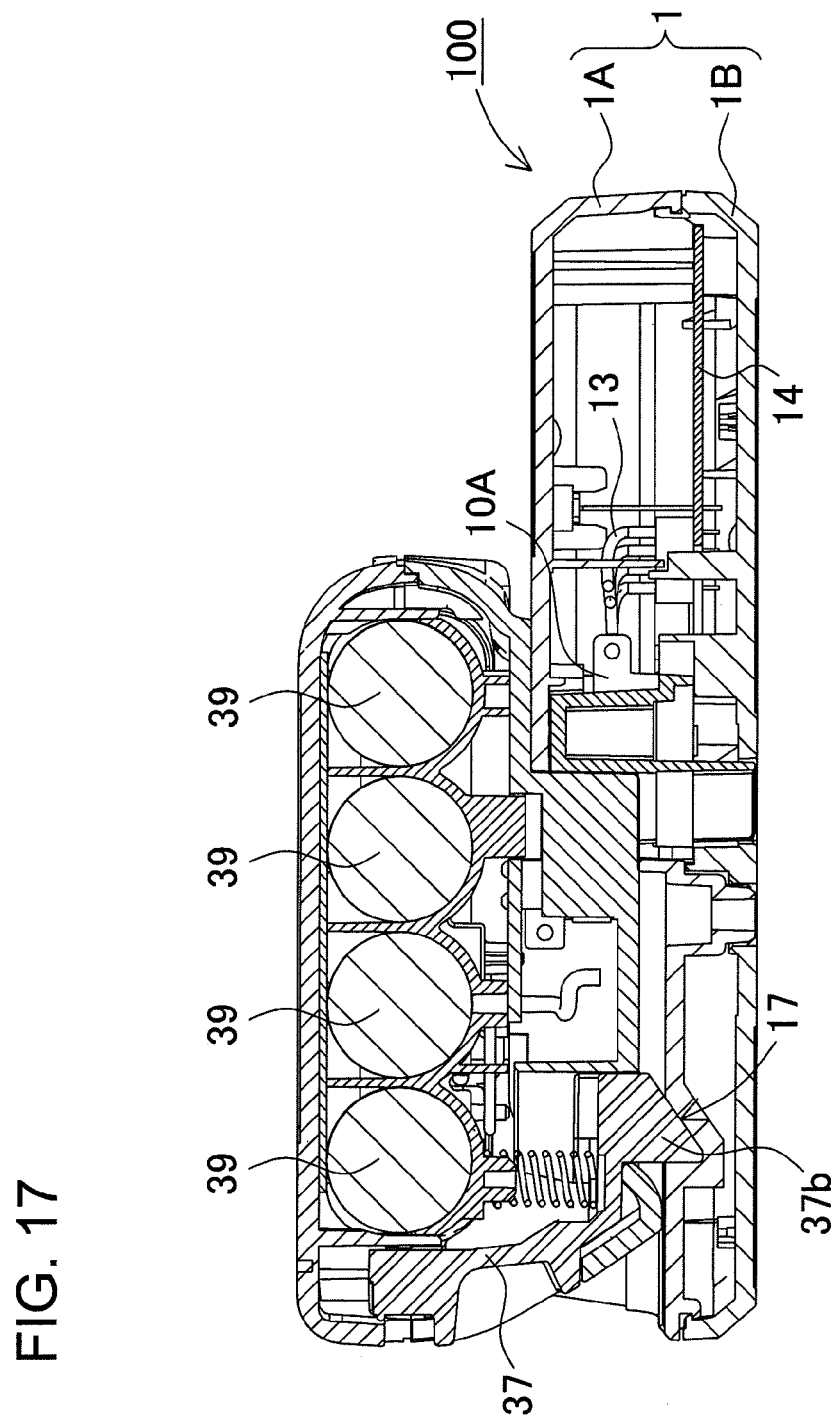
FIG. 17 is a lengthwise cross-sectional view taken along line XVII-XVII on the battery pack charger in FIG. 14.
Figure 18:
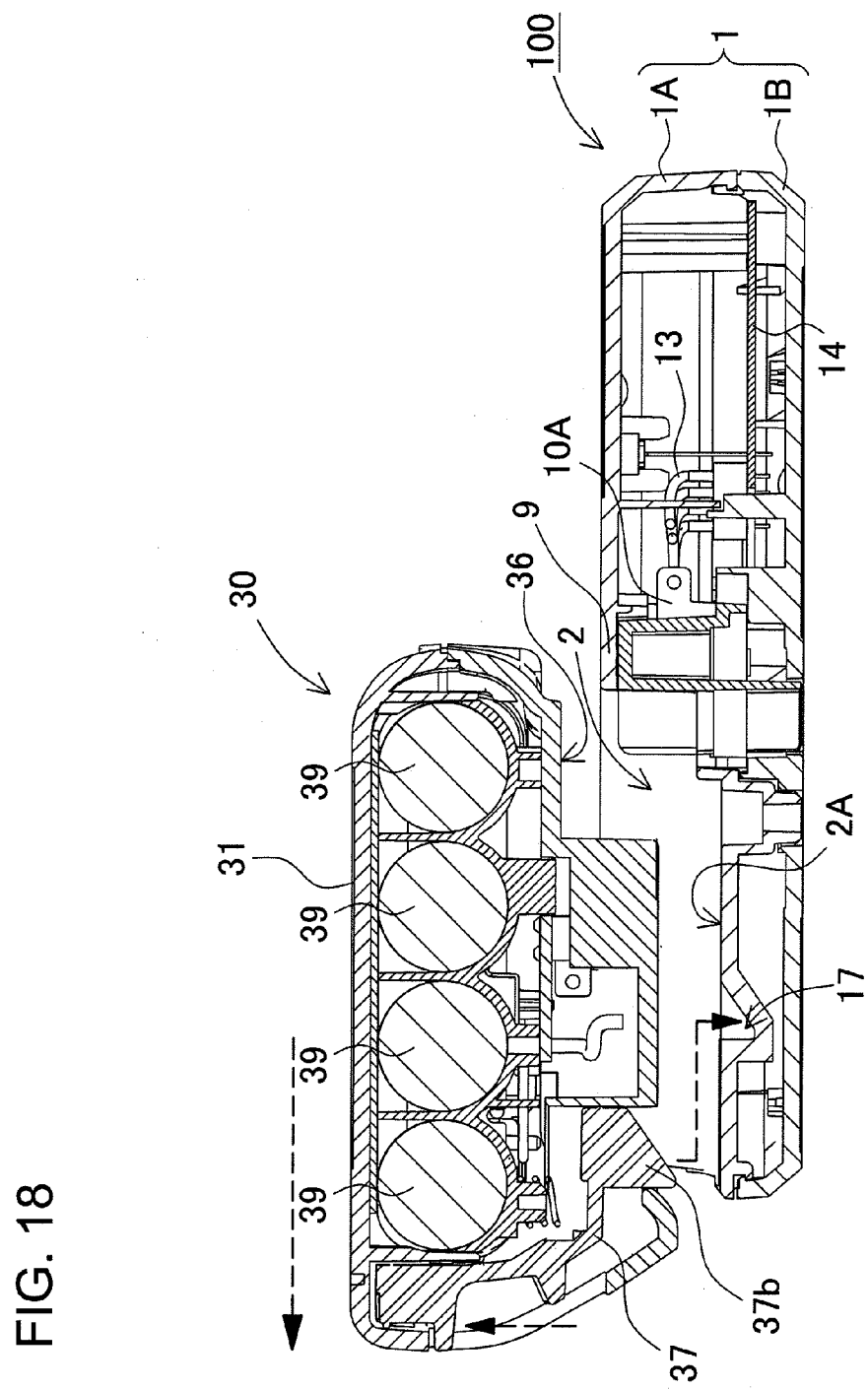
FIG. 18 is a lengthwise cross-sectional view showing the battery pack detached from the battery pack charger in FIG. 17.

As shown in FIGS. 17 and 18, the latch 37b is spring-loaded downward by a flexible component such as a coiled spring. When the battery pack 30 is being attached in the attachment section 2, the inclined surface of the latch 37b is pressed in a direction opposite the battery pack sliding direction and retracts allowing the battery pack 30 to slide into the attachment section 2. When the battery pack 30 slides into a given position in the attachment section 2, the latch 37b inserts into the retaining groove 17 at that location. The latch 37b is pressed downward by the flexible component to put the vertical surface of the retaining projection 37 in contact with the vertical surface of the retaining groove 17 and establish a latched condition. In this state, the vertical surfaces of the retaining projection 37 and the retaining groove 17 are butted against each other to maintain a locked state that prevents battery pack 30 sliding even when force is applied to pull the battery pack 30 from the attachment section 2. To detach the battery pack 30 from the battery pack charger 100, the user presses the retaining projection 37 latch release section upward to release the latch 37b from the locked state in the retaining groove 17. This lets the battery pack 30 to slide and allows it to be detached from the battery pack charger 100. Battery pack charger attachment guides 50 insert into battery pack guides 60 established on the sides of the battery pack 30 allowing the battery pack 30 to slide in the attachment section 2. When the battery pack 30 is pushed to the back of the attachment section 2, battery pack external terminals 33 make contact with battery pack charger 100 connecting terminals 3 and the retaining projection 37 latches into the retaining groove 17 to attach the battery pack 30 in the battery pack charger 100.

(Attachment Guides 50)

To insure that the battery pack 30 slides properly along the bottom surface 2A of the attachment section 2, guide projections protrude from the inside surfaces of opposing case 1 side-walls 6 as the attachment guides 50. In addition, guide grooves are established on both sides of the battery pack 30 casing 31 as the battery pack guides 60 that mate with the guide projections. As shown in the lateral cross-section of FIG. 20, the guide grooves are formed with groove openings that can accept insertion of the guide projections. When the battery pack 30 is being attached in the attachment section 2, the guide projections insert into the guide grooves on both sides of the battery pack 30 to guide the battery pack 30 into the attachment section 2 in the proper orientation. The guide projections can be formed in single-piece construction with the side-walls 6 at the battery pack insertion end of the case 1. The guide projections are established extending in the battery pack attachment direction. A battery pack 30 in the attachment section 2 slides along the guide projections allowing battery pack external terminals 33 to contact attachment section connecting terminals 3 in the proper orientation.

In the example described above, guide projections are provided in the attachment section 2 and guide grooves are provided on the battery pack 30. However, the structure is not limited to that configuration. For example, guide projections could also be provided on the battery pack and guide grooves could be provided in the attachment section.

(Connecting Terminals 3)

The attachment section 2 is provided with a plurality of connecting terminals 3 exposed for connection with battery pack 30 external terminals 33. As shown in the circuit diagram of FIG. 24, the connecting terminals 3 connect with external terminals 33 on a battery pack 30 attached in the attachment section 2 to supply charging power to the battery pack 30 or to send and receive various signals. The attachment section 2 of FIG. 1 has a plurality of connecting terminals 3 projecting out from the center region of the bottom surface 2A. The connecting terminals 3 are arranged side-by-side in a single column.

The connecting terminals 3 shown in FIG. 1 are flat metal plates 10 with essentially the same shape disposed in parallel orientation. The flat-plate connecting terminals 3 are disposed perpendicular to the bottom surface 2A of the attachment section 2 and are oriented in line with the battery pack insertion direction. In particular, by attaching connecting terminals 3 in a plurality of rows on the terminal holder 8 in perpendicular orientation and extending in the battery pack attachment direction, the connecting terminals 3 can smoothly make contact with battery pack external terminals 33 for proper connection.

The metal plate 10 connecting terminals 3 are made from sheet-metal with superior conductivity such as nickel, copper, or copper alloy sheet-metal. However, the connecting terminals are not necessarily limited to a flat-plate-shape. The connecting terminals can be any of various shapes that can protrude from the inside of the attachment section and connect with the external terminals on a battery pack attached in the attachment section.

The connecting terminals 3 have positive and negative charging terminals 4 disposed on both sides and non-charging terminals 5 disposed between the charging terminals 4. The charging terminals 4 are high-voltage positive and negative charging terminals for the purpose of charging batteries 39 housed in a battery pack 30. The non-charging terminals 5 are signal terminals for communicating battery information between the battery pack 30 and the battery pack charger 100. The battery pack charger 100 shown in FIGS. 3 and 4 has four connecting terminals 3 arranged side-by-side in a single column. The four connecting terminals 3 consist of a pair of charging terminals 4 disposed on both sides, and two non-charging terminals 5 that are signal terminals disposed between the charging terminals 4. However, the non-charging terminals are not necessarily restricted to two terminals, and one terminal as well as three or more non-charging terminals can also be provided.

Further, the plurality of connecting terminals 3 preferably has the non-charging terminals 5 disposed between the charging terminals 4 in a manner projecting outward further than the charging terminals 4 on both sides. If a metal foreign object contacts the top of connecting terminals 3 with this structure, the non-charging terminals 5 will preferentially contact a center region of the metal foreign object to prevent the ends of that object from simultaneously contacting the charging terminals 4 on both sides.

(Terminal Through-Holes 52)

Figure 14:
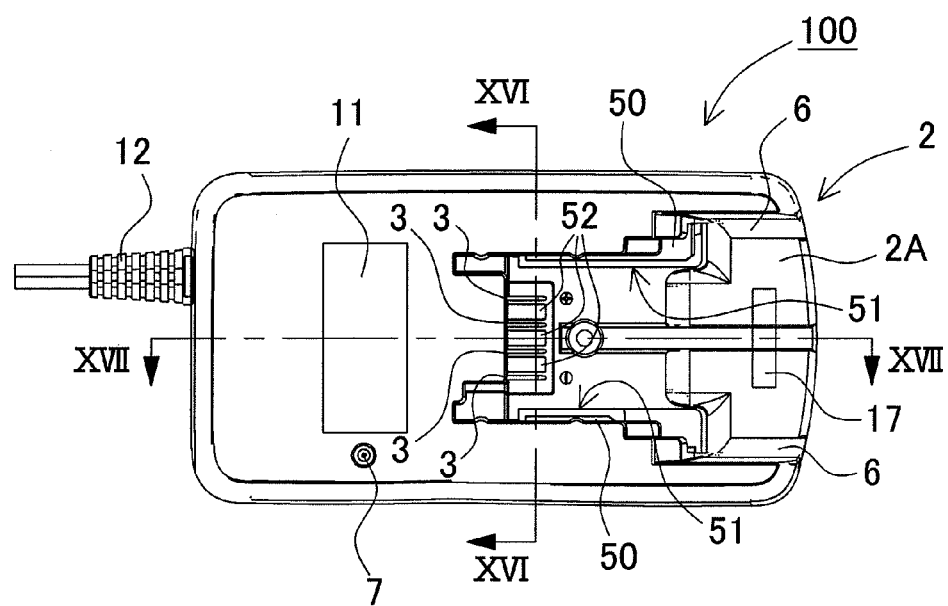
FIG. 14 is a plan view of the battery pack charger in FIG. 1.
Figure 15:
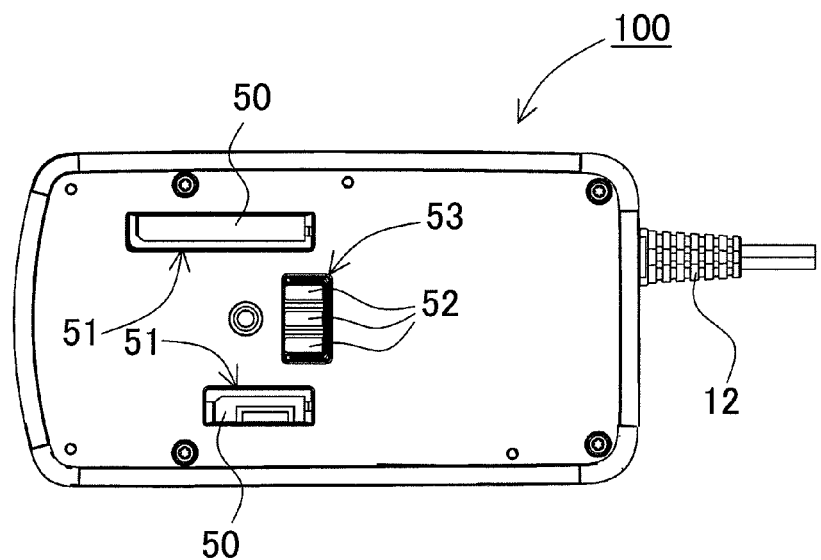
FIG. 15 is a bottom view of the battery pack charger in FIG. 1.

As shown in FIGS. 14 and 15, terminal through-holes 52 are formed between the case 1 connecting terminals 3. As shown in the lateral cross-section of FIG. 16, the terminal through-holes 52 are opened in straight-lines perpendicular to the case 1. Accordingly, even if foreign material such as dust and dirt enters the region between connecting terminals 3, it can fall below the case 1 through the through-holes and avoid build-up between the connecting terminals 3. As a result, unintended conduction such as leakage and short-circuit caused by foreign material residing between the connecting terminals 3 can be effectively avoided. A battery pack charger with through holes is also aesthetically interesting from a design perspective. As shown in FIGS. 14 and 15, terminal through-holes 52 are formed between adjacent connecting terminals 3, and three terminal through-holes 52 are formed when four connecting terminals 3 are used. In the example of FIGS. 2 and 15, a consolidated through-hole 53 that is larger than, and encompasses all the terminal through-holes 52 is opened through the bottom surface of the lower case. This connects the exit-sides of all the terminal through-holes 52 together in the larger consolidated through-hole 53. As a result, foreign material does not collect in the exit-regions and can smoothly exit from the case. In addition, establishing a larger consolidated through-hole 53 avoids mechanical strength problems associated with opening a plurality of adjacent through-holes. This can simplify the structure, improve mechanical strength, and reduce manufacturing cost.

(Terminal Holder 8)

Figure 4:
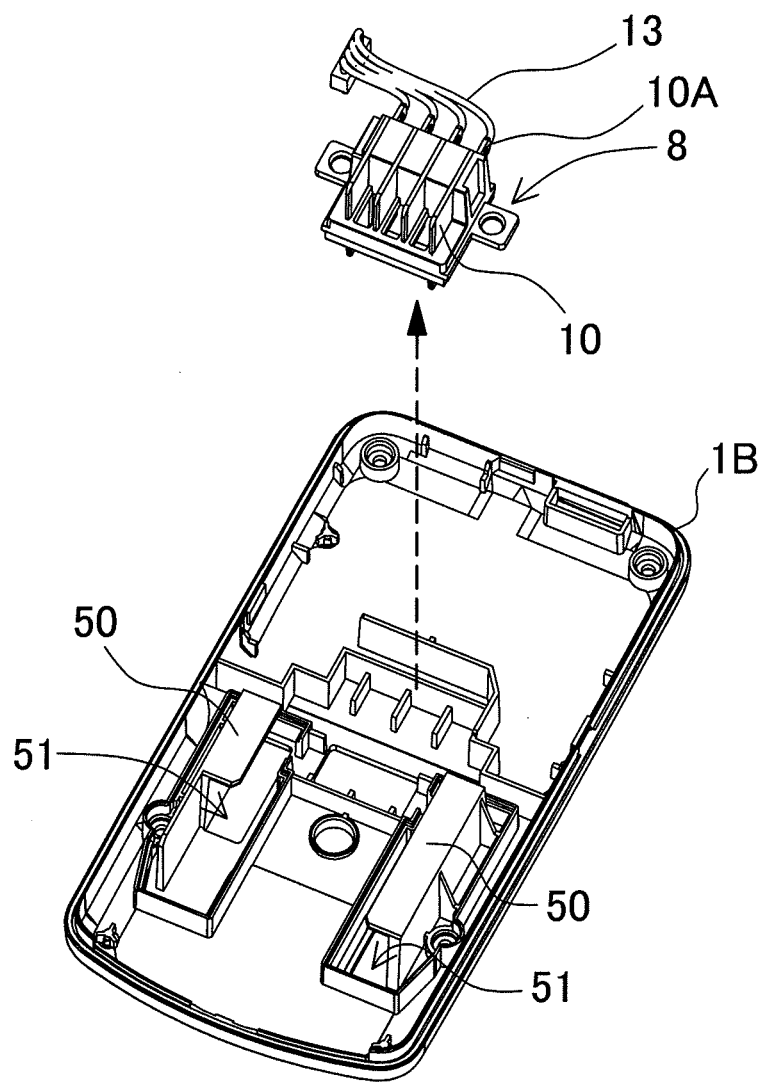
FIG. 4 is a perspective view showing the lower case in FIG. 3.
Figure 5:
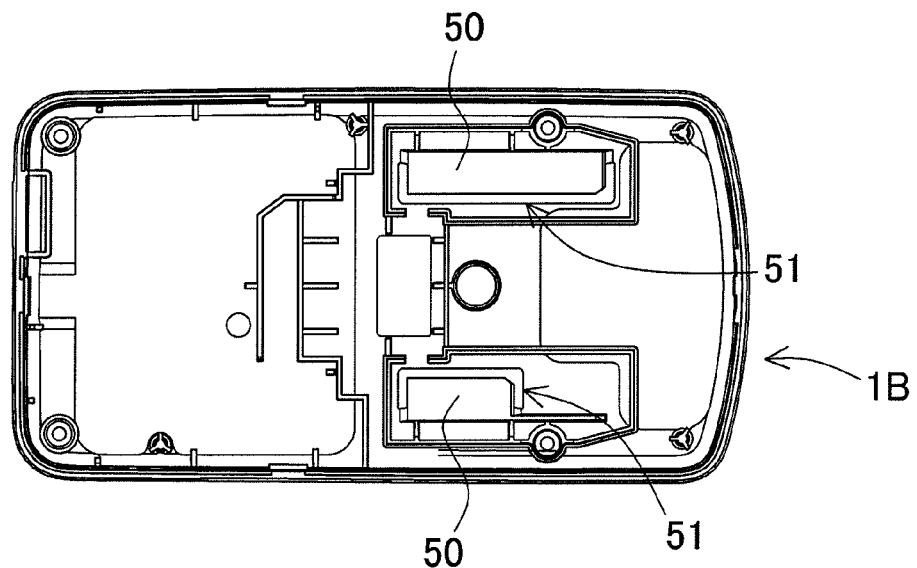
FIG. 5 is a plan view of the lower case.

As shown in figures such as FIGS. 3 and 4, the connecting terminals 3 are mounted in a terminal holder 8. The connecting terminals 3 shown in these figures are metal plates 10 insertion-molded into fixed positions in the terminal holder 8. The terminal holder 8 is formed from plastic in single-piece construction with an overall L-shape, and the metal plates 10 are insertion-molded into the interior-side of the knee of the L-shaped terminal holder 8. The terminal holder 8 with embedded metal plates 10 is installed inside a connecting opening 2B in the bottom surface 2A of the attachment section 2, which holds it in place in the attachment section 2 of the upper case 1A. In the example of FIG. 3, rectangular metal plates 10 are mounted in the terminal holder 8 with two connected edges, which are the bottom edge and the back (right) edge, insertion-molded in the terminal holder 8. With this arrangement, two connected edges of the metal plates 10 can be strongly held in the terminal holder 8 while the other two connected edges can achieve reliable electrical conduction with the external terminals 33 on the battery pack 30. However, the connecting terminals 3 are not limited to this structure. For example, three edges of the metal plates can be embedded in the terminal holder with only one edge (the left edge) exposed, and electrical connection with battery pack external terminals can be made in accordance with battery pack insertion sliding in from one direction. The metal plates 10 shown in the figures are provided with connecting regions 10A extending from the rear edges. The metal plates 10 are connected to the circuit board 14 disposed inside the case 1 via lead-wires 13 connected to the connecting regions 10A of the metal plates 10.

(Terminal Holder 8 Floating Configuration)

The terminal holder 8 is connected to the case 1 in a floating configuration. An example of a floating configuration is shown in figures such as FIGS. 6 and 7. Bosses 18 are provided in the upper case 1A, and boss insertion holes 8b with an inside diameter greater than the outside diameter of the bosses 18 are opened through the terminal holder 8 in positions corresponding to the boss 18 locations. The bosses 18 are inserted in the boss insertion holes 8b to install the terminal holder 8 with play between the upper case 1A and the lower case 1B. Accordingly, the terminal holder 8 is not completely fixed inside the case 1. Since the terminal holder 8 can move to some degree, the connecting terminals 3 are moved to comply with battery pack external terminal insertion during battery pack attachment. This achieves reliable connection and conduction by alignment such as terminal centering. In addition, dimensional mismatch can be absorbed to allow tolerance loosening for a battery pack connecting structure with superior yield and reliability. Depending on requirements, the bosses 18 can also be inserted in the boss insertion holes 8b with intervening flexible washers such as rubber washers to retain the terminal holder 8 in a flexible manner.

Although the example given above describes a configuration where the connecting terminals 3 are mounted in a terminal holder 8 and the terminal holder 8 is installed in the upper case 1A, the present invention is not limited to that structure and other configurations are clearly possible. For example, the terminal holder can be installed in the lower case, or the connecting terminals can be directly attached in the upper case.

(Attachment Section Through-Holes 51)

In addition to the terminal through-holes 52, attachment section through-holes 51 are opened through the attachment section 2 following the outlines of the attachment guides 50. As shown in FIGS. 5 and 14-16, the attachment section through-holes 51 are large enough to completely enclose the attachment guides 50. In other words, the attachment guides 50 are positioned inside the open area of the attachment section through-holes 51. Consequently, when the lower case 1B is molded, the part of the mold that forms the attachment guide regions can be extracted through the attachment section through-holes 51 to allow molded piece removal from the mold. Accordingly, the mold for the attachment guides 50 can have a mold-cavity insert allowing the attachment guides 50 to be formed in single-piece construction with each case using a simple mold structure. This also has the positive feature that lower cases with different sized attachment guides 50 can be made simply by changing the mold-cavity insert.

The attachment section through-holes 51 are opened as a pair of through-holes with slit shapes that sandwich the connecting terminals 3 in between. Further, the attachment section through-holes 51 are preferably positioned to at least partially overlap with the terminal through-holes 52 in the lengthwise direction. Accordingly, by opening terminal through-holes 52 between adjacent connecting terminals 3 and opening attachment section through-holes 51 on both sides, foreign material such as dust can be kept from accumulating on either side of any of the connecting terminals 3 and can be made to fall through the case through-holes to avoid leakage and short-circuit.

Figure 16:
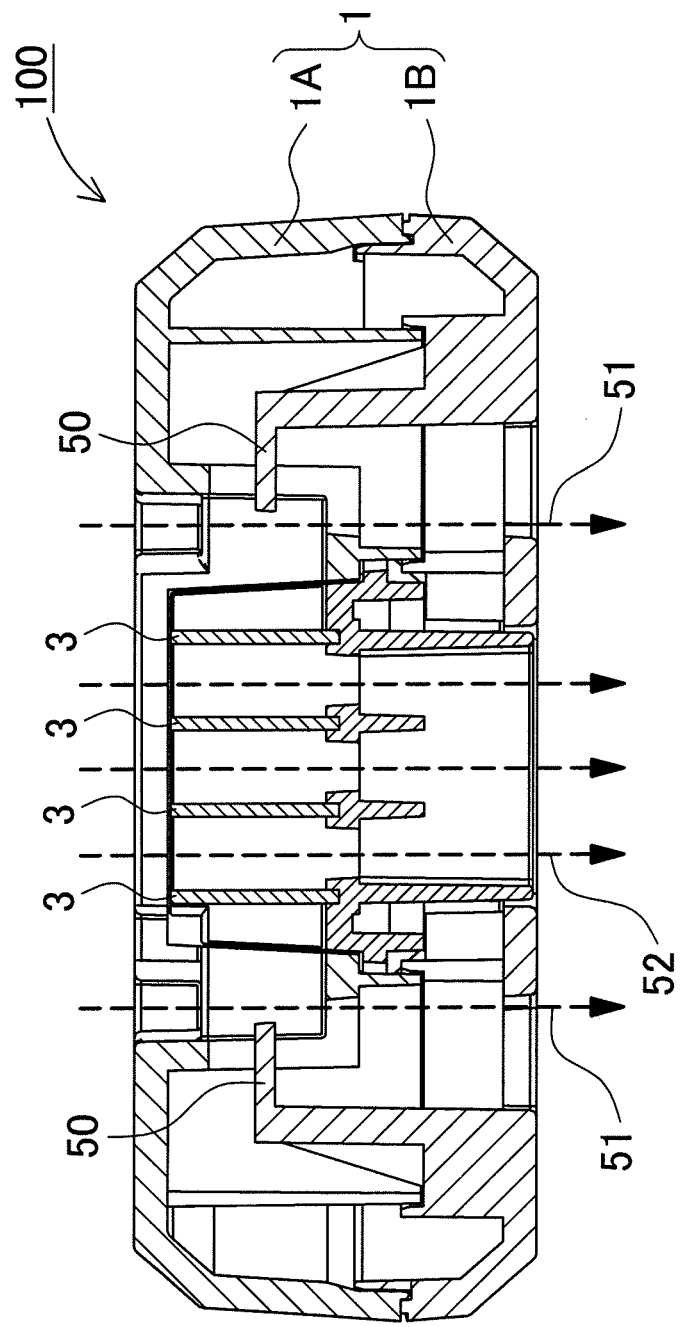
FIG. 16 is a lateral cross-sectional view taken along line XVI-XVI on the battery pack charger in FIG. 14.

As shown in the lateral cross-section of FIG. 16, the attachment section through-holes 51 are opened in a direction approximately parallel to the opening direction of the terminal through-holes 52. Accordingly, establishing attachment section through-holes 51 in the attachment section 2 allows moisture collection in the attachment section 2 and unintended electrical conduction to be avoided. Further, opening the attachment section through-holes 51 and the terminal through-holes 52 in the same direction has the positive feature that molded pieces can be more easily removed from the mold during case molding.

(Battery Pack 30 Discrimination Structure)

For molding this attachment guide 50 and attachment section through-hole 51 arrangement, through-holes must be formed larger than the attachment guides 50, but there is no obstacle from a molding perspective to making the attachment guides 50 smaller. Utilizing this fact, a structural feature can be added that discriminates battery pack suitability during attachment to the battery pack charger. Specifically, the size of the attachment guides can be changed according to battery pack electrical specifications. Accordingly, attachment of a battery pack with electrical specifications incompatible with the battery pack charger is physically impossible. This eliminates mistaken battery pack attachment during use and improves safety. The electrical specifications are the specifications that enable proper charging of the battery pack by the battery pack charger. For example, the electrical specifications are the battery pack specified voltage and charging current.

Here, the size of the attachment guides is changed while maintaining a constant size for the attachment section through-holes 51. This can improve manufacturability for different types of battery pack chargers because the upper case 1A is common and only the lower case 1B that forms the attachment guides 50 needs to be changed for different electrical specifications. The following describes the structure based on figures such as FIGS. 19 and 21. In this example, the lengths of the attachment guides 50 are changed, and corresponding positions of battery pack identifier ribs 62 established in the battery pack guides 60 are changed accordingly. In the figures, FIG. 19 relates to the battery pack charger 100 and battery pack 30 of FIGS. 8-10, and FIG. 21 relates to the battery pack charger 100' and battery pack 30' of FIG. 11.

(Battery Pack Identifier Ribs 62)

Figure 19:
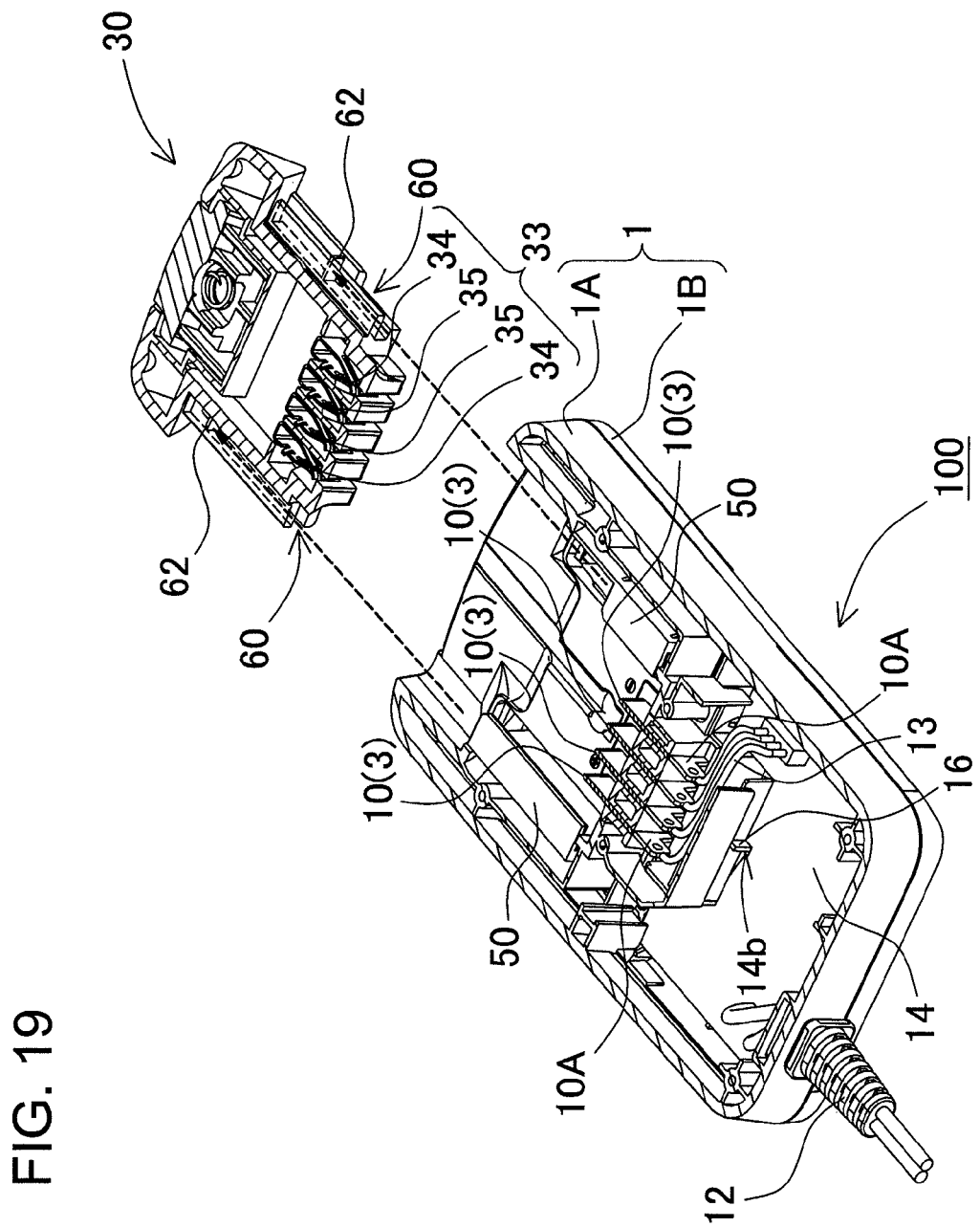
FIG. 19 is a perspective view from behind partially cross-sectioned horizontally showing the relation between attachment guide length and battery pack identifier ribs.
Figure 20:
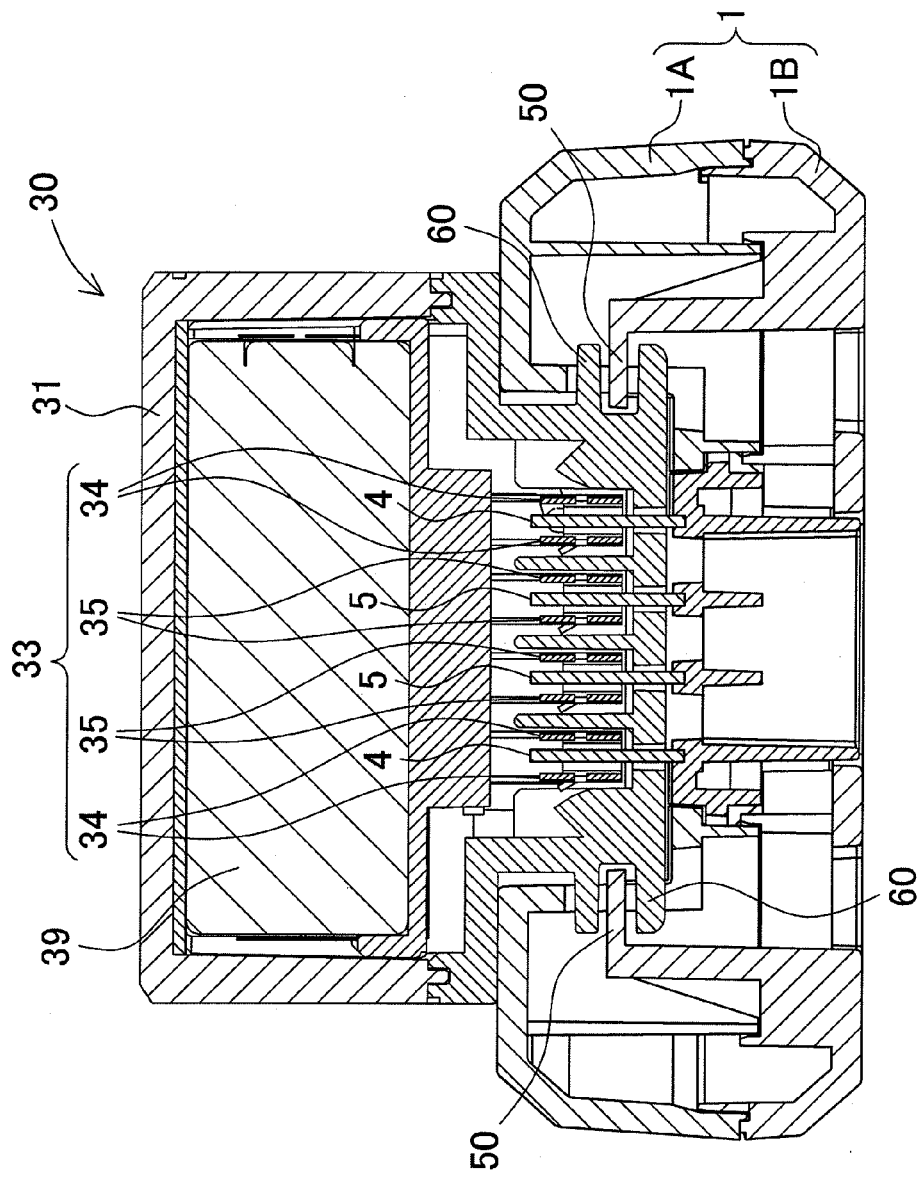
FIG. 20 is a lateral cross-sectional view taken along line XX-XX in FIG. 8.

As shown in the lateral cross-section of FIG. 20, a battery pack 30 can be attached to the battery pack charger 100 of FIG. 19 by inserting the attachment guides 50 in the battery pack guides 60. Here, battery pack identifier ribs 62 are established inside the battery pack guides 60 in a manner that makes contact with the ends of the attachment guides 50. Battery pack identifier ribs 62 are established intersecting with the lengthwise direction of the battery pack guides 60 to close-off the battery pack guides 60 and obstruct attachment guide 50 insertion. Battery pack identifier ribs 62 are formed in single-piece construction with the battery pack guides 60 in the shape of flat walls fixed at designated positions that completely close-off the battery pack guides 60. On the battery pack charger 100 side, the lengths of the attachment guides 50 are adjusted according to the positions of the battery pack identifier ribs 62. The lengths of the attachment guides 50 and the positions of the battery pack identifier ribs 62 are established to allow battery pack attachment with the ends of the attachment guides 50 in contact with the battery pack identifier ribs 62. Specifically, when the battery pack 30 is pushed into a position where it can no longer slide in the attachment section 2, battery pack 30 external terminals 33 make contact with battery pack charger 100 connecting terminals 3 and the battery pack 30 retaining projection 37 latches into the attachment section 2 retaining groove 17.

This attachment guide 50 length and battery pack identifier rib 62 relation is configured to only allow battery pack insertion in a battery pack charger with compatible electrical specifications. Said differently, when the battery pack charger and battery pack combination has incompatible electrical specifications, the battery pack identifier ribs 62 physically interfere with the ends of the attachment guides 50 making it impossible to slide the battery pack into the attachment section. As a result, mistakenly putting a battery pack in the wrong battery pack charger can be avoided and erroneous charging can be prevented to insure safe operation. For example, the battery pack 30 shown in FIG. 19 houses four rechargeable batteries 39 connected in series. The battery pack charger 100 housing a charging circuit 20 suitable for charging that battery pack 30 has different left and right attachment guide 50 lengths that allow attachment of that battery pack 30. Accordingly, the positions of battery pack identifier ribs 62 established on the left and right sides of the battery pack 30 are also different. Specifically, in the figure, the battery pack charger 100 attachment guide 50 on the left side is made long and the attachment guide 50 on the right side is made short. Correspondingly on the battery pack 30, the battery pack identifier rib 62 in the battery pack guide 60 on the left side is positioned towards the rear of the battery pack 30 and the battery pack identifier rib 62 in the battery pack guide 60 on the right is positioned more towards the front. As shown in FIG. 20, each battery pack identifier rib 62 is configured to contact the end of an attachment guide 50 inserted in the respective battery pack guide.

Figure 21:
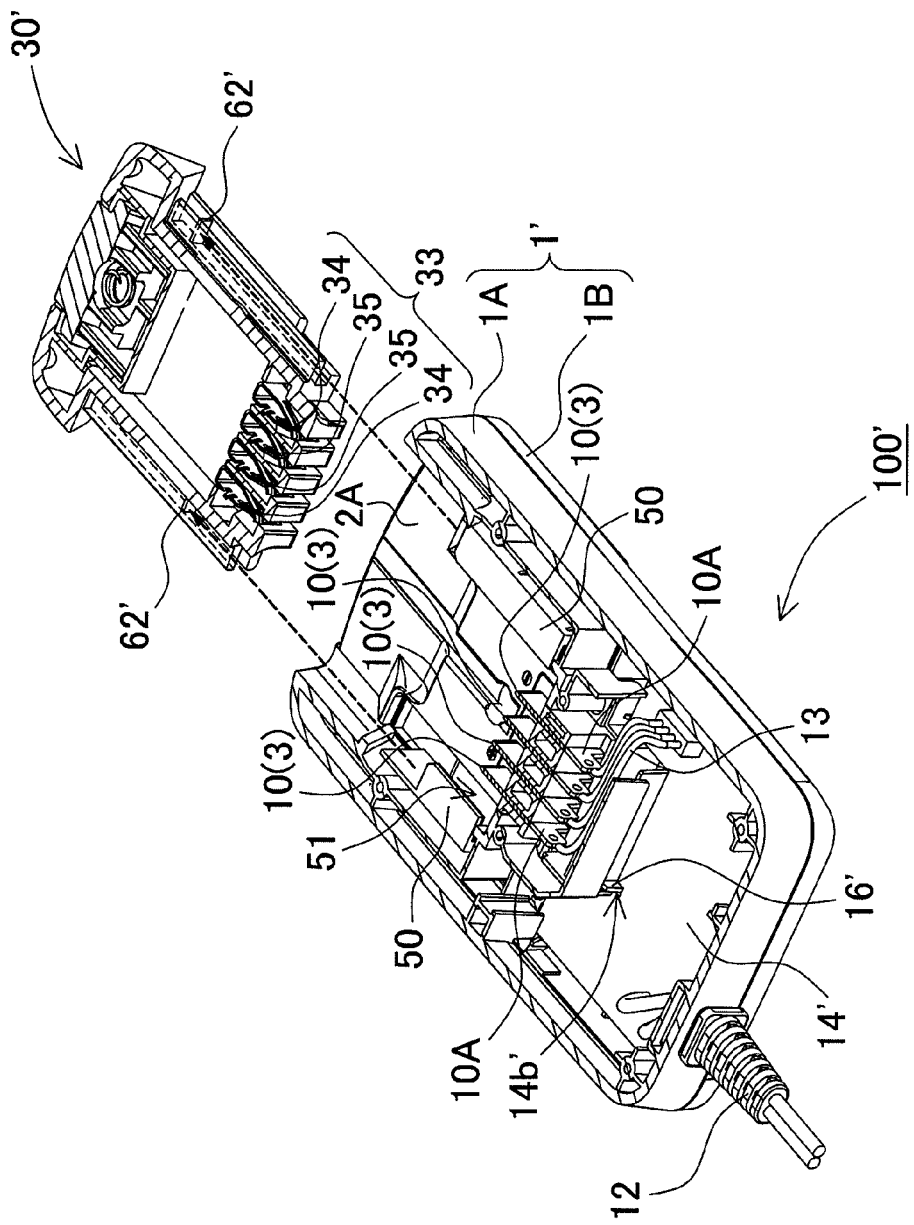
FIG. 21 is a perspective view from behind partially cross-sectioned horizontally showing another example of the relation between attachment guide length and battery pack identifier ribs.

Turning to a different battery pack charger 100' and battery pack 30' combination shown in FIG. 21, different attachment guide 50 lengths and battery pack identifier rib 62' positions are adopted. The battery pack 30' houses five rechargeable batteries 39 connected in series, and the battery pack charger 100' contains a charging circuit 20 compatible with that battery pack 30'. In the figure, the battery pack charger 100' attachment guide 50 on the left side is made short and the attachment guide 50 on the right side is made long. Correspondingly on the battery pack 30', the battery pack identifier rib 62' in the battery pack guide 60 on the left side is positioned towards the front of the battery pack 30' and the battery pack identifier rib 62' in the battery pack guide 60 on the right is positioned towards the rear. With this combination, the battery pack 30' in FIG. 21 can be attached to the battery pack charger 100'. However, the battery pack 30' in FIG. 21 cannot be attached to the battery pack charger 100 in FIG. 19. Similarly, the battery pack 30 in FIG. 19 cannot be attached to the battery pack charger 100' in FIG. 21. This is because the lengths of the attachment guides do not correspond to the battery pack identifier rib positions and physically prevent the battery pack from sliding into an attached position. Consequently, even when both the battery packs 30, 30' of FIGS. 19 and 21 are used in a mixed operating environment, battery pack attachment can only be made in combination with battery pack chargers having compatible electrical specifications (FIGS. 8-10 and FIG. 11), and attachment is physically impossible for incompatible combinations. This prevents incorrect attachment during use and allows safe operation. This is only one example, and even in the case of three or more different type battery packs used together, incorrect battery pack attachment can be avoided with different combinations of attachment guide length and battery pack identifier rib position. Further, only a mold-cavity insert, which uses the attachment section through-holes 51 to advantage, needs to be changed to form different length attachment guides during lower case 1B molding. This achieves the positive feature that all other molds are common and manufacturing cost can be reduced.

(Assembly Discrimination Structure)

In the manner described above, insertion of a battery pack with incorrect electrical specifications can be prevented during operation of the battery pack charger. The battery pack charger can also be configured with a structure that prevents assembly with incorrect parts during battery pack charger manufacture. Specifically, the circuit board carrying the battery pack charging circuit has a structure that only allows a circuit board having electrical specifications compatible with a battery pack that can be physically attached during operation (according to the battery pack discrimination structure described above) to be mounted inside the case of a battery pack charger during assembly.

(Circuit Board Mounting Rib 16)

Figure 22:
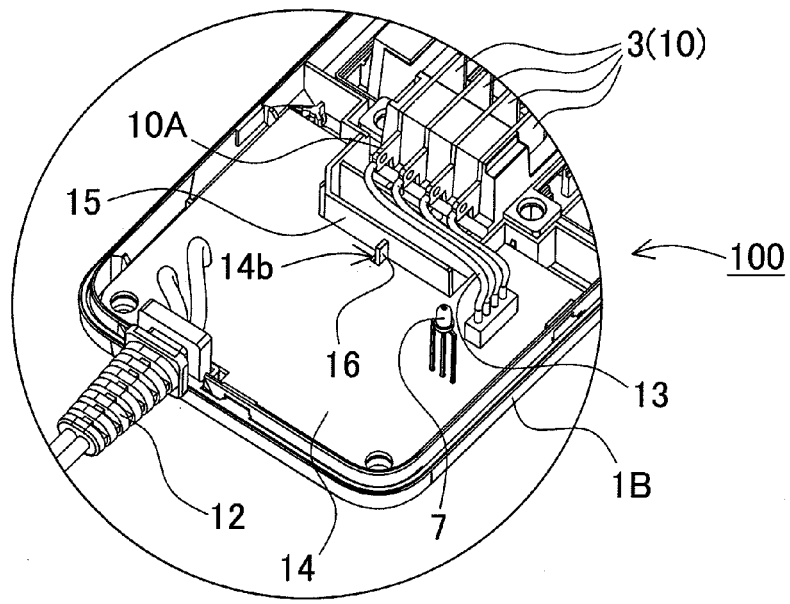
FIG. 22 is a perspective view from behind showing an example of the positional relation between the circuit board mounting rib and the circuit board slit.
Figure 23:
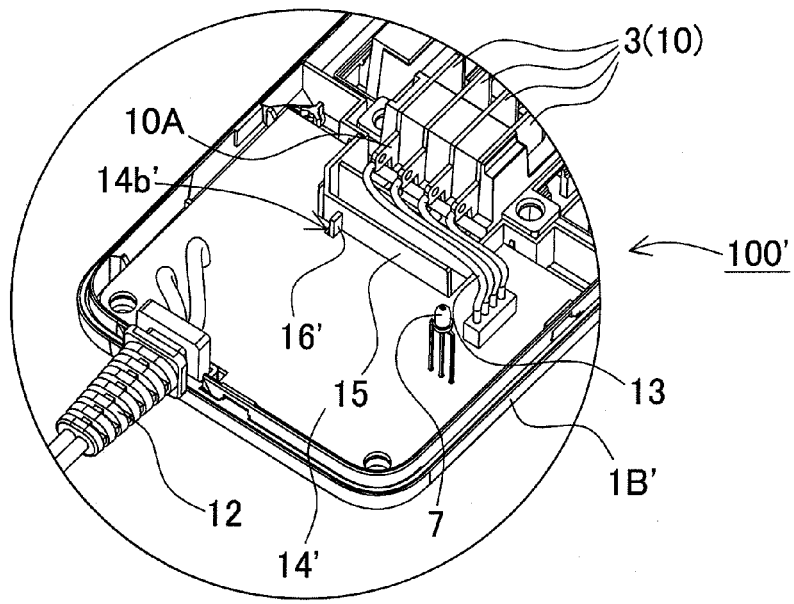
FIG. 23 is a perspective view showing another example of the positional relation between the circuit board mounting rib and the circuit board slit.

The following description is based on FIGS. 22 and 23. The circuit board 14 roughly has an overall U-shape and fits in a circuit board holder in the lower case 1B. A circuit board holder rib 15 is provided to position the cut-out region of the U-shaped circuit board 14 for mounting in the lower case 1B.

A circuit board mounting rib 16 is formed in the lower case 1B to align the circuit board 14 for mounting in a fixed position in the lower case 1B. In the example of each figure, a circuit board mounting rib 16 is established on one part of the circuit board holder rib 15. Further, a circuit board slit 14b is formed in a position corresponding to the circuit board mounting rib 16 for its insertion. In this manner, a circuit board 14 can be properly aligned in a given position in the lower case 1B. In addition, assembly of a circuit board 14 with electrical specifications that do not match with the lower case 1B can be avoided by the positional relation of the circuit board mounting rib 16 and circuit board slit 14b. Specifically, the positions of the circuit board mounting rib 16 and circuit board slit 14b are different in FIGS. 22 and 23.

Figure 11:
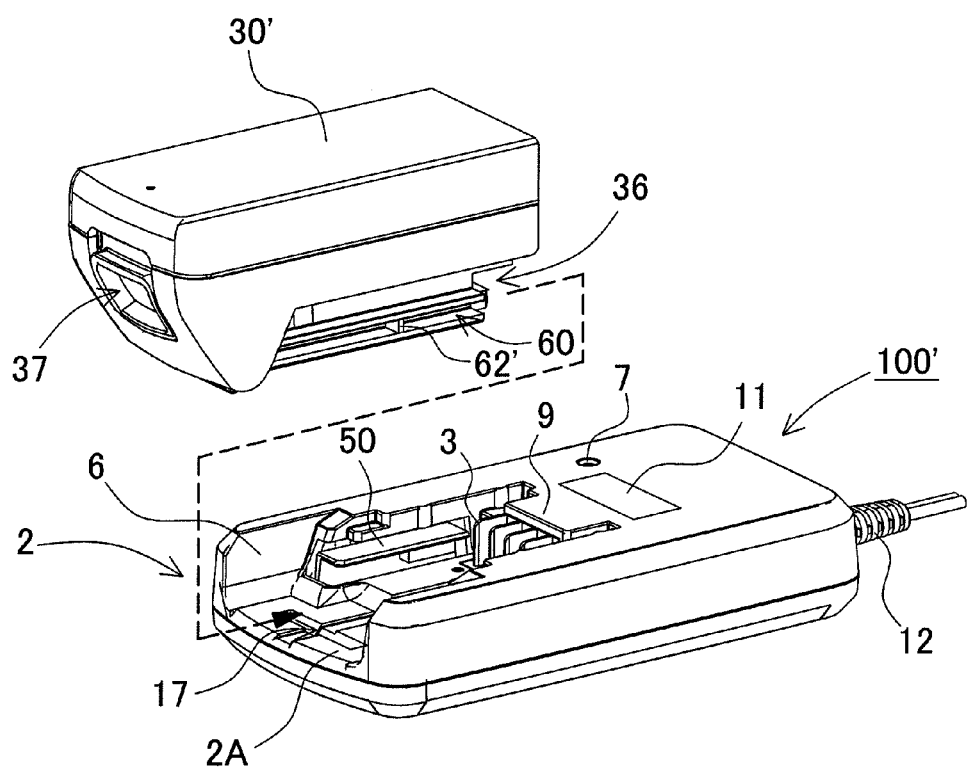
FIG. 11 is a perspective view showing attachment of a battery pack with different electrical specifications to a compatible battery pack charger.

In these figures, the example in FIG. 22 corresponds to the battery pack charger 100 and battery pack 30 of FIG. 19 and FIGS. 8-10, and the example in FIG. 23 corresponds to the battery pack charger 100' and battery pack 30' of FIG. 21 and FIG. 11. Because of this distinction, erroneous component selection must be avoided during assembly. Therefore, circuit board mounting rib and circuit board slit positions are set to allow mounting of a circuit board when it carries a charging circuit with electrical specifications compatible with a battery pack that attaches in the attachment section of a case with attachment guides sized for that battery pack and a circuit board mounting rib positioned to allow that circuit board to be mounted. Specifically in the example of FIG. 22, a circuit board mounting rib 16 is established at the center of the circuit board holder rib 15, and a corresponding circuit board slit 14b is formed in the center of the cut-out region of the U-shaped circuit board 14. In contrast, the circuit board mounting rib 16' in the example of FIG. 23 is established at the left side of the circuit board holder 15, and the circuit board slit 14b' is formed at the left side of the cut-out region of the U-shaped circuit board 14'. As a result of this structure, the circuit board 14 in FIG. 22 cannot be assembled in the lower case 1B' of FIG. 23. Similarly, the circuit board 14' in FIG. 23 cannot be assembled in the lower case 1B of FIG. 22. Consequently, a circuit board, which carries a charging circuit with electrical specifications compatible with a battery pack attachable in the attachment guides, can be mounted in that lower case. Conversely, a circuit board with electrical specifications that do not match the attachable battery pack cannot be mounted. This allows simple discrimination of compatible and incompatible circuit boards and lower cases during assembly. As a result, putting erroneous components together during assembly can be avoided to contribute to improved yield and reliability.

(Charging Circuit 20)

The positive and negative charging terminals 4 disposed on both sides of the connecting terminals 3 connect to the positive and negative charging and discharging terminals 34 of a battery pack 30 attached in the attachment section 2 to supply charging power to the battery pack 30. As shown in the circuit diagram of FIG. 24, the positive charging terminal 4 is connected to a charging circuit 20 that supplies power to the battery pack 30 and charges the batteries 39 inside the battery pack 30. In the battery pack charger 100 of the figure, alternating current (AC) from a commercial power source (not illustrated) is converted to direct current (DC) by a rectifying circuit 22, the DC voltage is converted to a voltage appropriate for battery charging by the charging circuit 20, and the resulting power is output from the charging terminals 4. For example, the charging circuit 20 regulates charging voltage and current to optimum values for charging the battery pack 30 by adjusting the ON and OFF duty cycle of a switching device (not illustrated) connected between the output-side of the rectifying circuit 22 and the positive charging terminal 4.

The non-charging terminals 5 disposed between the pair of charging terminals 4 are signal terminals. The connecting terminals 3 shown in the figures are provided with two signal terminals. The signal terminals are allocated as an error signal terminal where battery pack 30 internal battery 39 error signals are input, and a temperature signal terminal where battery pack 30 internal battery 39 temperature signals are input. A terminal can also be used as a battery pack discrimination signal terminal where signals are input to determine the type of batteries 39 inside the battery pack 30, or another terminal can be provided. However, the signal terminals can also be designated for communicating other signals. For example, signal terminals can also be allocated for transmitting the state of battery charge and various other battery data.

When an error signal is input to the error signal terminal, a control circuit 21 in the battery pack charger judges that a battery pack 30 abnormality has occurred and switches the charging circuit 20 OFF to stop charging. In addition, the control circuit 21 detects the temperature of the batteries 39 housed in the battery pack 30 from temperature signals input to the temperature signal terminal. When battery temperature rises above a maximum temperature, the control circuit 21 cuts-off charging current to suspend charging or it reduces charging current to lower the battery temperature. When battery temperature drops below a set temperature, charging with normal charging current is resumed.

When a discrimination signal terminal is provided, the control circuit 21 can determine the optimum voltage and current values for charging a battery pack 30 from battery discrimination signals input to the discrimination signal terminal, and can change the charging voltage and current output from the charging terminals 4 accordingly. When the battery pack 30 is attached to the battery pack charger 100, a discrimination signal is output from the battery pack 30 control section 40 and received by the battery pack charger control circuit 21. The control circuit 21 determines the battery pack 30 type from the input battery discrimination signal, and controls the charging circuit 20 to charge the battery pack 30 with the optimum charging voltage and current values. This battery pack charger 100 switches charging voltage and current to values most appropriate for the attached battery pack 30 as determined from the battery discrimination signal input from the battery pack 30. Therefore, a plurality of battery pack types having different voltages can be charged with a single battery pack charger. However, switching the output voltage is not a necessary requirement, and the battery pack charger can also charge battery packs with a set output voltage.

(Rechargeable Batteries 39)

The battery pack 30 has a box-shape outline and houses a plurality of rechargeable batteries 39. The battery pack 30 attaches in a detachable manner to electrical equipment such as electric power tools to supply power to those devices. As shown in the cross-sections of FIGS. 17 and 18, the battery pack 30 houses a plurality of rechargeable batteries 39 disposed in approximately parallel orientation inside the casing 31. The rechargeable batteries 39 housed in the battery pack 30 are lithium ion batteries. However, any other batteries that can be charged such as nickel hydride batteries, nickel cadmium batteries, and polymer batteries can also be used. The rechargeable batteries can be connected with a plurality of batteries in series to increase output voltage or with a plurality of batteries in parallel to increase output current. For example, in a battery pack 30 with lithium ion rechargeable batteries 39, four batteries can be connected in series for an output voltage of 14.4V, or five batteries can be connected in series for an output voltage of 18V. However, the number of batteries and their connection configuration in the battery pack is not specified or limited. The battery pack can be designed to house various numbers of rechargeable batteries with various output voltages depending on the type of electrical equipment and application for that battery pack.

Figure 24:
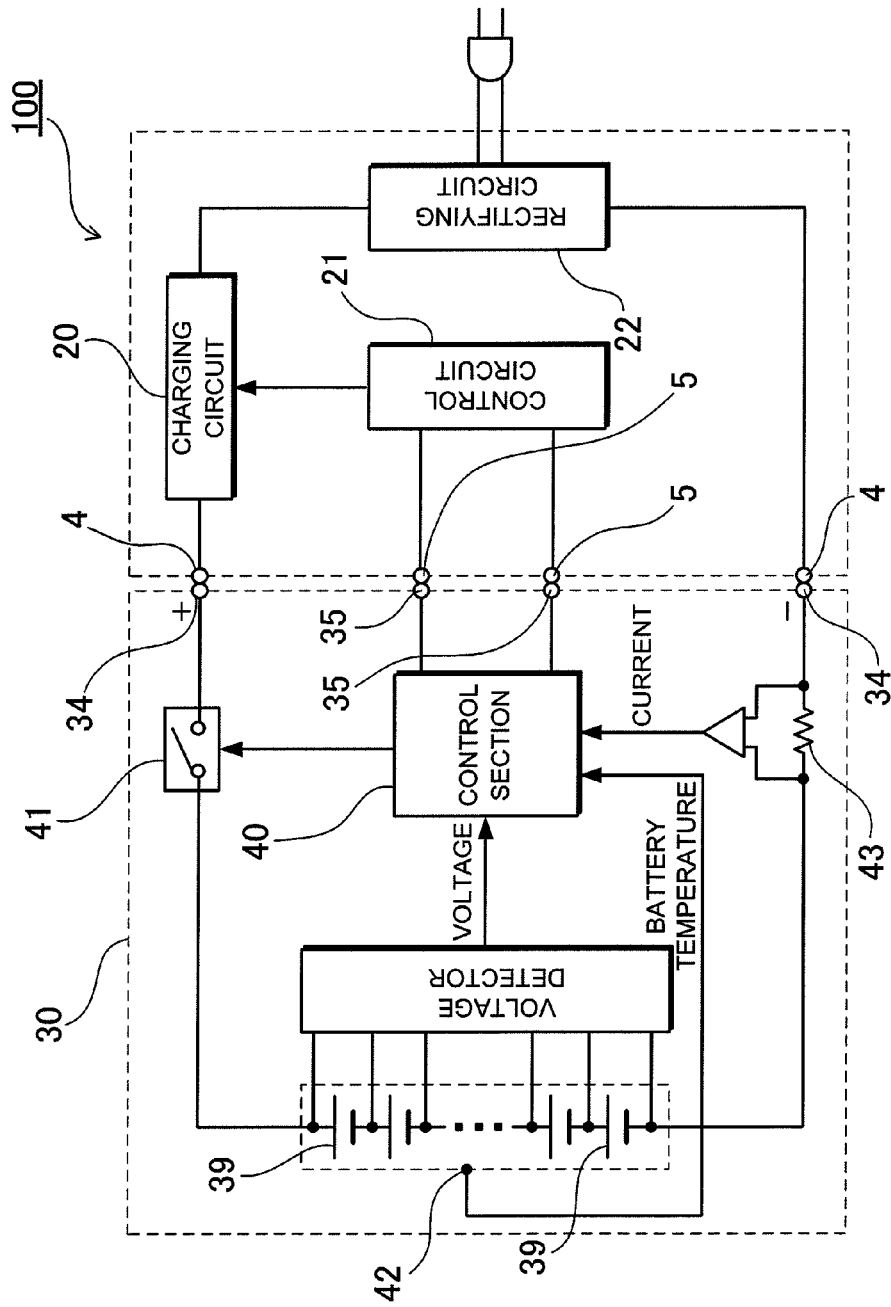
FIG. 24 is a circuit diagram showing a battery pack connected to a battery pack charger for an embodiment of the present invention.
Figure 25:
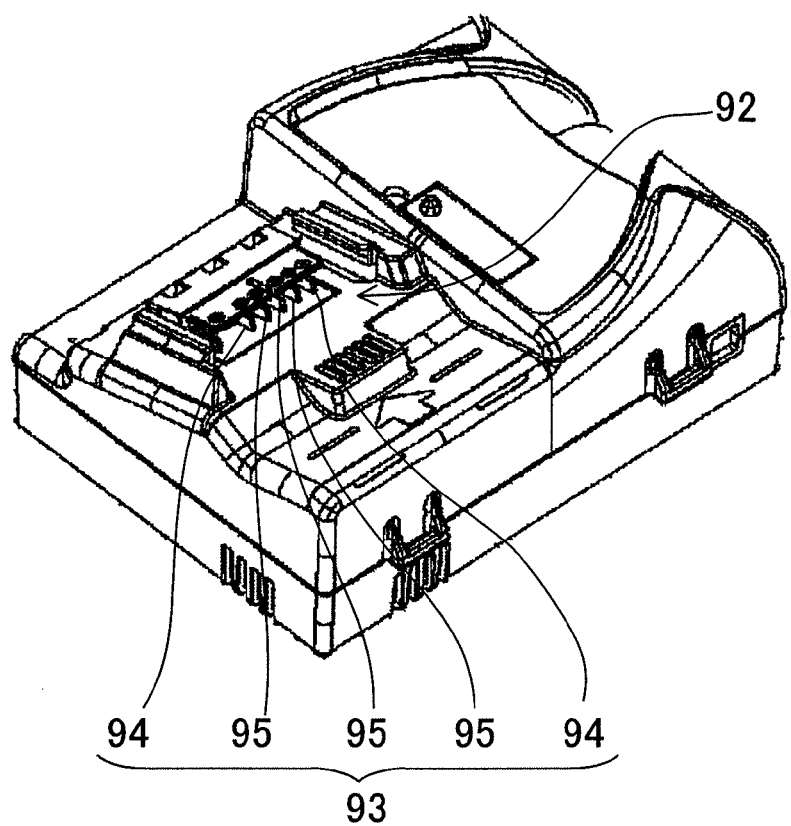
FIG. 25 is a perspective view of a prior art battery charger.

Further, the battery pack 30 of FIGS. 24, 10, and 11 is provided with a plurality of external terminals 33 that connect to the plurality of connecting terminals 3 disposed in the attachment section 2 of the battery pack charger 100. The plurality of external terminals 33 is disposed on an attachment surface 32, which is the bottom surface of the battery pack 30 that faces the bottom surface 2A of the attachment section 2 when the battery pack 30 is attached in the battery pack charger 100 attachment section 2. The battery pack 30 of the figures is provided with a stepped cavity 36 in the bottom surface of the casing 31. A mounting projection 9 that protrudes outward from the battery pack charger 100 attachment section 2 fits into the stepped cavity 36 to guide the battery pack 30 into a fixed position in the attachment section 2.

Further, the battery pack 30 of FIGS. 12 and 13 is provided with a plurality of parallel disposed lengthwise grooves 38 in the attachment surface 32, and flexible contacts, which are the external terminals 33, are disposed inside those lengthwise grooves 38. The flexible contact external terminals 33 make electrical connection with flat-plate connecting terminals 3 inserted into the lengthwise grooves 38 by resiliently applying pressure on both sides of the connecting terminals 3. The external terminals 33 of the figures are provided with charging and discharging terminals 34 disposed on both sides, and communication terminals 35 disposed between the charging and discharging terminals 34. The charging and discharging terminals 34 on both sides connect with the charging terminals 4 on the battery pack charger 100, and the centrally located communication terminals 35 connect with the non-charging terminals 5, which are the signal terminals on the battery pack charger 100. The communication terminals 35 are a plurality of signal terminals that serve to transmit data, which are related to the plurality of internally housed rechargeable batteries 39, outside the battery pack 30. The communication terminals 35 can output data signals such as battery pack 30 internal battery 39 error signals, temperature signals, or battery discrimination signals.

In addition, the battery pack 30 shown in FIG. 24 is provided with a charging and discharging switch 41 connected in series with the rechargeable batteries 39, and a control section 40 that controls the charging and discharging switch 41 OFF when a battery 39 abnormality is detected. The charging and discharging switch 41 is switched from ON to OFF when the rechargeable batteries 39 become fully charged to prevent over-charging. The charging and discharging switch 41 is also switched OFF when the rechargeable batteries 39 become completely discharged to prevent over-discharging.

The control section 40 detects current flowing through the rechargeable batteries 39 and battery voltage to compute the remaining battery capacity. A current detection resistor 43 connected in series with the batteries is provided to detect the battery current. Voltage is detected on both sides of the current detection resistor 43 to determine the charging current and discharging current flowing through the batteries. In addition, when the control section 40 detects excessive battery current or abnormally high battery temperature, it switches the charging and discharging switch 41 OFF to cut-off current flow through the rechargeable batteries 39. When the control section 40 detects an internal battery abnormality, it issues an error signal to the outside from the communication terminals 35.

Further, the battery pack of FIG. 24 is provided with a temperature sensor 42 to detect the battery temperature. The temperature sensor 42 is a thermistor disposed in close proximity to, and thermally connected to the rechargeable batteries 39. The temperature sensor 42 changes its electrical resistance corresponding to the temperature of the rechargeable batteries 39 to detect battery temperature. When the rectangular battery 39 temperature detected by the temperature sensor 42 rises above a set temperature, the control section 40 switches the charging and discharging switch 41 OFF to suspend charging or discharging. The control section 40 also outputs data from the communication terminals 35 indicating an abnormally high battery temperature.

The battery pack charger of the present invention can be used to advantage as a battery charger for charging electrical equipment such as electric power tools, electrically assisted bicycles, electric motor scooters, electric motorcycles, and portable equipment such as mobile telephones. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2010-085570 filed in Japan on Apr. 1, 2010, the content of which is incorporated herein by reference.

What is claimed is:

1. A battery pack charger for charging a chargeable battery pack attached in a detachable manner comprising:
 a case forming an attachment section capable of attaching the battery pack in a detachable manner at a first side of the case;

a circuit board provided on a second side of the case in a non-overlapping manner with the first side, the second side being aligned with the first side;

a battery pack charging circuit mounted on the circuit board; and a plurality of connecting terminals disposed in an exposed manner in the attachment section to connect with external terminals on the battery pack, wherein the connecting terminals are parallel to each other and are disposed in an approximately vertical orientation, and wherein the case has terminal through-holes opened through the case between adjacent connecting terminals, wherein the attachment section is configured with attachment guides to guide battery pack guides established on the battery pack and attach the battery pack in the attachment section, wherein the attachment section is formed with a cavity cross-section in the upper surface of the case, wherein the attachment guides are formed so as to protrude from interior walls on both sides of the attachment section cavity, wherein attachment section through-holes are formed through the attachment section following the outlines of the attachment guides and having more area than the attachment guides, wherein the attachment section through-holes are opened in a direction approximately parallel to the opening direction of the terminal through-holes, and wherein the attachment section through-holes are opened in a slit shape, and the attachment guides are disposed in a manner stacked above the open areas of the attachment section through-holes.

2. The battery pack charger as cited in claim 1, wherein the attachment section through-holes are formed as a pair of through-holes that sandwich the connecting terminals, and the attachment section through-holes are positioned to at least partially overlap with the terminal through-holes in the lengthwise direction.

3. The battery pack charger as cited in claim 1 wherein the connecting terminals are mounted in a terminal holder, and the terminal holder is connected to the case in a floating configuration.

4. The battery pack charger as cited in claim 3 wherein bosses are provided in the case, and boss insertion holes with an inside diameter greater than the outside diameter of the bosses are opened through the terminal holder in positions corresponding to the boss locations; and the bosses are inserted in the boss insertion holes with intervening flexible washers so that the terminal holder is joined to the case in a floating configuration.

5. The battery pack charger as cited in claim 1 wherein the plurality of connecting terminals have a flat-plate shape and are disposed in parallel orientation, and the flat-plate connecting terminals are disposed perpendicular to the bottom surface of the attachment section extending in a direction parallel to the battery pack detachment sliding direction.

6. The battery pack charger as cited in claim 1 wherein the plurality of connecting terminals are provided with positive and negative charging terminals disposed on both sides, and non-charging terminals disposed between the charging terminals.

7. The battery pack charger as cited in claim 1, wherein electrical specifications are determined by the number of rechargeable batteries included in the battery pack.

8. The battery pack charger as cited in claim 1, wherein a consolidated through-hole is formed in a bottom surface of the case, and the consolidated through hole is positioned and sized so as to be communicated with exit-sides of all of the terminal through-holes.

9. The battery pack charger as cited in claim 8, wherein the consolidated through-hole is sized to encompass all of the terminal through-holes in a vertical direction.

10. The battery pack charger as cited in claim 8, wherein the consolidated through-hole directly underlies the terminal through-holes, and the size of the consolidated through-hole is larger than a combined size of the terminal through-holes.

11. A battery pack charger for charging a chargeable battery pack attached in a detachable manner, the battery pack charger comprising:

a case forming an attachment section capable of attaching the battery pack in a detachable manner at a first side of the case;

a circuit board provided on a second side of the case in a non-overlapping manner with the first side, the second side being aligned with the first side;

a battery pack charging circuit mounted on the circuit board; and a plurality of connecting terminals disposed in an exposed manner in the attachment section to connect with external terminals on the battery pack, wherein the connecting terminals are parallel to each other and are disposed in an approximately vertical orientation, wherein the case has terminal through-holes opened through the case between adjacent connecting terminals, wherein the attachment section is configured with attachment guides to guide battery pack guides established on the battery pack and attach the battery pack in the attachment section, wherein the attachment section is formed with a cavity cross-section in the upper surface of the case, wherein the attachment guides are formed so as to protrude from interior walls on both sides of the attachment section cavity, wherein attachment section through-holes are formed through the attachment section following the outlines of the attachment guides and having more area than the attachment guides, wherein the attachment section through-holes are opened in a direction approximately parallel to the opening direction of the terminal through-holes, wherein the battery pack charger is configured to form the attachment guides with sizes adjusted to correspond to battery pack charger electrical specifications while keeping the attachment section through-holes a constant size, and wherein battery pack guides on a battery pack, electrically compatible with the battery pack charger, are shaped to fit with the attachment guides so that the battery pack can be attached in the attachment section.

12. The battery pack charger as cited in claim 11 wherein the battery pack charger is configured to make the length of the attachment guides according to the position of battery pack identifier ribs established in the battery pack guides, when a battery pack with compatible electrical specifications is attached to the battery pack charger, the ends of the attachment guides contact the battery pack identifier ribs allowing the battery pack to be attached in the attachment section, and when an attempt is made to attach a battery pack that is not electrically compatible with the battery pack charger, interference between the battery pack identifier ribs and the ends of the attachment guides make battery pack guide and attachment guide insertion impossible.

13. The battery pack charger as cited in claim 12 wherein the case is made up of an upper case and a lower case, and the attachment guides are formed in the lower case.

14. The battery pack charger as cited in claim 13 wherein the battery pack charger is configured to form the lower case with a mold that has a mold-cavity insert, and attachment guides having different lengths can be formed by changing the mold-cavity insert.

15. The battery pack charger as cited in claim 11,
wherein the case is formed with a circuit board mounting rib for mounting the circuit board,
wherein the circuit board is made with a circuit board slit in a position corresponding to the circuit board mounting rib to allow its insertion,
wherein the positions of the circuit board mounting rib and the circuit board slit are set to allow a circuit board to be mounted in a case provided with attachment section attachment guides sized for a battery pack with electrical specifications compatible with the charging circuit on the circuit board, and
wherein the circuit board can be mounted in the case when the charging circuit on the circuit board has electrical specifications compatible with the battery pack that fits in the attachment guides in the case, while a circuit board having electrical specifications compatible with a different battery pack cannot be mounted in the case.

16. The battery pack charger as cited in claim 15 wherein the battery pack charger is configured with a mold-cavity insert in the mold that forms the case, and the circuit board mounting rib can be formed in different positions by changing the insert in the mold-cavity.

* * * * *